United States Patent [19]

Slack et al.

[11] Patent Number: 4,593,367

[45] Date of Patent: Jun. 3, 1986

[54] PROBABILISTIC LEARNING ELEMENT

[75] Inventors: Thomas B. Slack, Oxford; Jeffrey N. Denenberg, Trumbull, both of Conn.

[73] Assignee: ITT Corporation, New York, N.Y.

[21] Appl. No.: 571,230

[22] Filed: Jan. 16, 1984

[51] Int. Cl.⁴ .................. G09C 00/00; G06F 7/22; G06F 1/00; G06K 9/62

[52] U.S. Cl. .................. 364/513; 364/200; 364/900; 364/134; 382/15

[58] Field of Search ............ 364/134, 148, 149, 200, 364/300, 513, 728, 877, 900; 382/15

[56] References Cited

U.S. PATENT DOCUMENTS

| | | | |
|---|---|---|---|
| 3,103,648 | 9/1963 | Hartmanis | 340/172.5 |
| 3,196,399 | 7/1965 | Kamentsky | 340/146.3 |
| 3,267,431 | 8/1966 | Greenberg | 340/146.3 |
| 3,414,885 | 12/1968 | Müller | 340/172.5 |
| 3,440,617 | 4/1969 | Lesti | 340/172.5 |
| 3,446,950 | 5/1969 | King, Jr. | 235/197 |
| 3,457,552 | 7/1969 | Asendorf | 340/172.5 |
| 3,562,502 | 8/1971 | Kautz | 235/152 |
| 3,581,281 | 5/1971 | Martin | 340/146.3 |
| 3,588,823 | 6/1971 | Chow | 340/146.3 |
| 3,601,811 | 8/1971 | Yoshino | 340/172.5 |
| 3,613,084 | 10/1971 | Armstrong | 340/172.5 |
| 3,623,015 | 11/1971 | Schmitz et al. | 340/172.5 |
| 3,638,196 | 1/1972 | Nishiyama et al. | 340/172.5 |
| 3,646,329 | 2/1972 | Yoshino et al. | 235/150.1 |
| 3,678,461 | 7/1972 | Choate et al. | 340/172.5 |
| 3,700,866 | 10/1972 | Taylor | 235/150.1 |
| 3,701,974 | 10/1972 | Rusell | 340/172.5 |
| 3,702,986 | 11/1972 | Taylor et al. | 340/172.5 |
| 3,715,730 | 2/1973 | Smith et al. | 364/200 X |
| 3,716,840 | 2/1973 | Masten et al. | 364/200 X |
| 3,725,875 | 4/1973 | Choate et al. | 364/200 X |
| 3,753,243 | 8/1973 | Ricketts, Jr. et al. | 340/172.5 |
| 3,772,658 | 11/1973 | Sarlo | 340/173 R |
| 3,934,231 | 1/1976 | Armstrong | 340/172.5 |
| 3,950,733 | 4/1976 | Cooper et al. | 364/200 X |
| 3,988,715 | 10/1976 | Mullan et al. | 340/146.3 |
| 3,999,161 | 12/1976 | van Bilzem et al. | 340/146.3 |
| 4,066,999 | 1/1978 | Spanjersberg | 340/146.3 |
| 4,100,370 | 7/1978 | Suzuki et al. | 179/1 SB |
| 4,189,779 | 2/1980 | Brautingham | 364/718 |
| 4,286,330 | 8/1981 | Isaacson | 364/900 |
| 4,318,083 | 3/1982 | Argyle | 350/146.3 |
| 4,384,273 | 5/1983 | Ackland et al. | 364/513 X |
| 4,450,530 | 5/1984 | Llinas et al. | 364/513 |
| 4,504,970 | 3/1985 | Werth et al. | 364/513 X |
| 4,507,760 | 3/1985 | Fraser | 364/134 X |

OTHER PUBLICATIONS

Roberts, "Artificial Intelligence" *BYTE*, Sep. 1981, 164–178.
Jackson, Jr., "*Introduction to Artificial Intelligence*" Petrocelli, New York 1974.
Healy, "Machine Intelligence and Communications in Future NASA Missions", *IEEE Communications*, vol. 19, No. 6, pp. 8–15.
Bennett, Jr. "How Artificial is Intelligence", *American Scientist*, vol. 65, pp. 694–702.

*Primary Examiner*—Jerry Smith
*Assistant Examiner*—Jon D. Grossman
*Attorney, Agent, or Firm*—Peter C. Van Der Sluys

[57] ABSTRACT

A probabilistic learning element particularly adapted for use as a task independent sequential pattern recognition device receives sequences of objects and outputs sequences of recognized states composed of objects and includes a plurality of memories for storing the received sequences of objects and previously learned states as well as predetermined types of knowledge relating to previously learned states. The sequences of received objects are correlated with the information relating to the previously learned states in order to assign probabilities to possible next states in the sequence of recognized states. Based upon the probabilities of the possible next states the most likely next state is determined and outputted as a recognized next state in the recognized state sequence when the element determines that a state has ended. The element additionally includes means for providing a rating of confidence in the recognized next state. The ratings of confidence for a sequence of recognized stated are accumulated and if the accumulated value exceeds a predetermined threshold level the element will be caused to store the recognized state sequence as a learned state sequence.

14 Claims, 14 Drawing Figures

CONTEXT ORGANIZED MEMORY FOR "MISSISSIPPI"

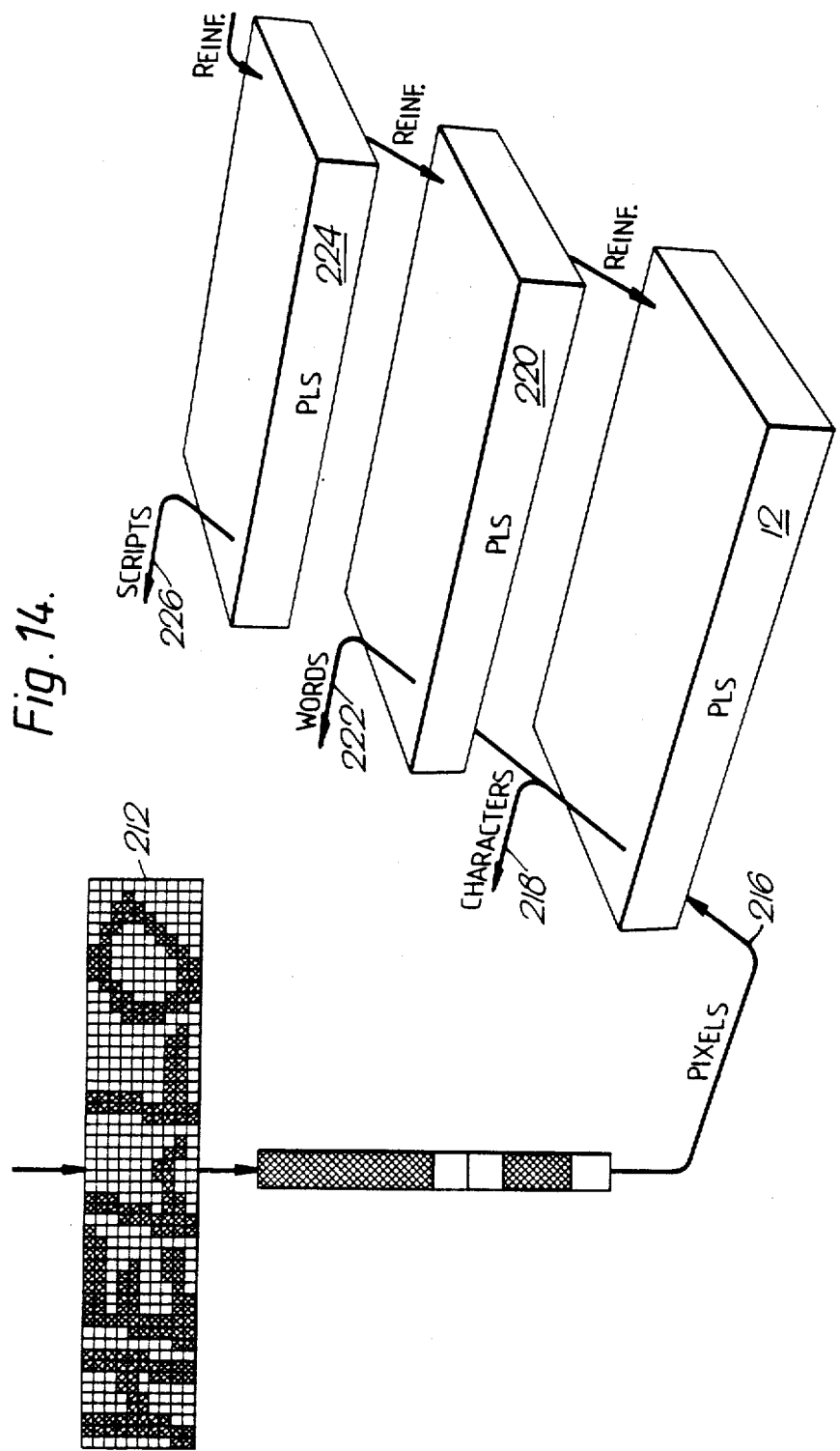

PROBABILISTIC LEARNING ELEMENT

CROSS REFERENCE TO RELATED APPLICATIONS

Reference is made to the following co-pending patent applications:

U.S. application Ser. No. 571,222 filed Jan. 16, 1984 by J. N. Denenberg entitled PROBABILISTIC LEARNING SYSTEM, which application is commonly assigned herewith.

U.S. application Ser. No. 571,223 filed Jan. 16, 1984 by C. C. Tan et al entitled PROBABILISTIC LEARNING ELEMENT EMPLOYING CONTEXT DRIVEN SEARCHING, said application being commonly assigned herewith.

U.S. application Ser. No. 571,027 filed Jan. 16, 1984 by A. R. Smith et al entitled IMPROVED PROBABILISTIC LEARNING ELEMENT, said application being commonly assigned herewith.

BACKGROUND OF THE INVENTION

1. Field of the Invention

The present invention relates generally to recognition systems and more particularly to trainable or learning systems, which are capable of modifying their own internal processing in response to information descriptive of system performance.

2. Description of the Prior Art

Recognition systems of the type that recognize patterns deal with the problem of relating a set of or sequence of input objects or situations to what is already known by the system. This operation is a necessary part of any intelligent system since such a system must relate its current input and input environment to what it has experienced in order to respond appropriately.

A pattern recognition task is typically divided into three steps: data acquisition, feature extraction, and pattern classification. The data acquisition step is performed by a transducer which converts measurements of the pattern into digital signals appropriate for a recognition system. In the feature extraction step these signals are converted into a set of features or attributes which are useful for discriminating the patterns relevant to the purposes of the recognizer. In the final step of pattern classification these features are matched to the features of the classes known by the system to decide which class best explains the input pattern.

The division between the step of feature extraction and pattern classification is somewhat arbitrary. A powerful feature extractor would make the classifier's job trivial and conversely, a powerful decision mechanism in the classifier would perform well even with simple features. However in practice, feature extractors tend to be more task dependent. For example, data acquisition and feature extraction for hand-printed character recognition will differ from that needed for speech recognition. Pattern classification on the other hand can be designed to be task independent, although it often is not.

A particular category of pattern recognition tasks is characterized by whether or not the features can be reduced to a linear sequence of input objects for the classification step. This category is called sequential pattern recognition. Examples of tasks which naturally fall into this category are optical character recognition, waveform recognition, and speech recognition. Other tasks such as computer image recognition can be placed within sequential pattern recognition by an appropriate ordering of the features.

Patterns of features must be acquired by the pattern recognizer for a new class of features before the system can recognize the class. When patterns cannot be learned from examples, acquisition of the patterns is a major problem.

Prior art optical character and speech recognition systems correlate input patterns with a set of templates, in order to determine a "best match". A correlation is performed using a particular algorithm which is specifically derived for the matching operation required for a particular problem such as speech recognition, character recognition, etc . . . A change in type font or speaker, for example, would require replacing the templates and changing parameters of the alqorithm in such prior art systems.

Many trainable systems exist in the prior art, of which the following U.S. Patents are descriptive. U.S. Pat. No. 3,950,733, an Information Processing System, illustrates an adaptive information processing system in which the learning growth rate is exponential rather than linear. U.S. Pat. No. 3,715,730, a Multi-criteria Search Procedure for Trainable Processors illustrates a system having an expanded search capability in which trained responses to input signals are produced in accordance with predetermined criteria. U.S. Pat. No. 3,702,986, a Trainable Entropy System illustrates a series of trainable non-linear processors in cascade. U.S. Pat. No. 3,700,866, a synthesized Cascaded Processor System illustrates a system in which a series of trainable processors generate a probabilistic signal for the next processor in the cascade which is a best estimate for that processor of a desired response. U.S. Patent Nos. 3,638,196 and 3,601,811, Learning Machines, illustrate the addition of hysteresis to perceptron-like systems. U.S. Pat. No. 3,701,974, Learning Circuit, illustrates a typical learning element of the prior art. U.S. Pat. No. 3,613,084, Trainable Digital Apparatus illustrates a deterministic synethesized boolean function. U.S. Pat. No. 3,623,015, Statistical Pattern Recognition System With Continual Update of Acceptance Zone Limits, illustrates a pattern recognition system capable of detecting similarities between patterns on a statistical basis. U.S. Pat. Nos. 3,999,161 and 4,066,999 relate to statistical character recognition systems havinq learning capabilities.

Other patents that deal with learning systems that appear to be adaptive based upon probability or statistical experience include U.S. Pat. Nos. 3,725,875; 3,576,976; 3,678,461; 3,440,617 and 3,414,885. Patents showing logic circuits that may be used in the above systems include U.S. Pat. Nos. 3,566,359; 3,562,502; 3,446,950; 3,103,648; 3,646,329; 3,753,243; 3,772,658; and 3,934,231.

Adaptive pattern, speech or character recognition systems are shown in the following U.S. Pat. Nos. 4,318,083; 4,189,779; 3,581,281; 3,588,823; 3,196,399; 4,100,370; and 3,457,552. U.S. Pat. No. 3,988,715 describes a system that develops conditional probabilities character by character with the highest probability being selected as the most probable interpretation of an optically scanned word. U.S. Pat. No. 3,267,431 describes a system that uses a "perceptron", a weighted correlation network, that is trained on sample patterns for identification of other patterns.

Articles and publications relating to the subject matter of the invention include the following: *Introduction*

To *Artifical Intelligence*, P. C. Jackson Jr., Petrocelli/-Charter, N.Y. 1974 pages 368-381; "Artifical Intelligence", S. K. Roberts, *Byte*, Vol. 6, No. 9, September 1981, pages 164-178; "How Artificial Is Intelligence?", W. R. Bennett Jr., *American Scientist*, Vol. 65, November-December 1977, pages 694-702; and "Machine Intelligence and Communications In Future NASA Missions", T. J. Healy, *IEEE Communications Magazine*, Vol. 19, No. 6, November 1981, pages 8-15.

SUMMARY OF THE INVENTION

The present invention provides a probabilistic learning system (PLS) which performs the task independent pattern classification step for sequential pattern recognition systems and which acquires pattern descriptions of classes by learning from example. Thus, the PLS of the present invention is an adaptive or trainable learning system. Although a PLS could be applied to the problem of selecting good features for the feature extraction step that application will not be described here.

The PLS may comprise a plurality of probabilistic learning elements (PLE's) configured in an array or could be an individual PLE depending upon overall system requirements. Each PLE is a element operating in accordance with its own set of multi-dimensional databases which are "learned" or altered through feedback from the environment in which it operates. The array or the PLE has as its input a sequence of objects containing information, such as pixels, characters, speech or digital input from the environment. This information is processed as it passes throuqh the array or the PLE, thereby generating an output which may be either extracted knowledge in the form of an output state, such as a recognized pattern, or a set of control signals to be fed back for use as a future input modification, i.e. a process control adaptive equalizer.

The invention includes control mechanisms to provide performance feedback information to the array or the PLE. This information is used locally by each PLE of the array to modify its own databases for more appropriate behavior. Such performance feedback information can be supplied either to the entire array (globally) or to selected positions of the array, i.e one row, column or to the PLE involved in the generation of a particular output.

It is a primary objective of the present invention to utilize, in each individual PLE four interacting, but independent processing modules. An input module receives and stores input object sequence information. The input module provides two outputs. Firstly, a set of most probable output states that would end at the present time and their probabilities. Secondly, the probability that some state ends at the present time. A predict module receives and stores information on output state options including state and length information. The predict module provides information on probable state length outputs. A decide module is responsive to the first output of the input module, the output of the predict module and previous state options to derive a current list of state options. An output module receives the list of state options and the second output of the input module to choose the best state option which is outputted along with a confidence factor signal. When the confidence factor signal exceeds a predetermined threshold value, the databases in both the input and predict modules are updated with the new valid data.

The data stored concerning the input objects and output states includes several types of knowledge extracted from the actual input objects and output states. Sets of extracted knowledge are stored and correlated in the modules using various methods of association depending upon the type of knowledge included in the particular set. The membership function of each set is learned using the adaptive process of the PLE.

The types of knowledge extracted and stored include: frequency of objects and sequences of objects; position and positional frequency of objects and sequence of objects within states; state-lengths and state frequencies.

The PLE uses context driven searching in context organized memories to maintain a high throughput from the large database. Efficient searching is facilitated by organizing the inputted objects and the various types of extracted intelligence in context.

When a plurality of PLE's are used in an array to form a PLS parallelism may be employed to speed up task execution. When using an array the size of the individual PLE's may be reduced as opposed to that required to do a complete task. The overall task is broken down into subtasks each accomplished by single PLE's or combinations of PLE's.

In order to maintain the general purpose nature of the PLS and its use for wide applicability the representation step for specific tasks is accomplished in an input preprocessor rather than in the array itself.

BRIEF DESCRIPTION OF THE DRAWINGS

FIG. 14 illustrates a script reading system using a plurality of PLS's.

DESCRIPTION OF THE INVENTION

Prior to describing the invention it may be helpful to define certain terms used in the description.

Object: a feature extracted by the device immediately before the PLS and inputted to the PLS. An object may be a picture element (pixel), a set of pixels, a character or even a word depending upon the application.

State: a recognized item outputted from the PLS such as a character, a word or a script depending upon the application.

Length: the number of objects in a state.

State-Length Pair: a state and its length indexed and stored together.

Position: information which identifies that an inputted object is part of a state and where in the sequence of all objects that are in that state it occurs. Conversely, this same information identifies that a particular state was formed of a particular set of objects from the sequence sent by the feature extractor. Thus, the position of a state means both where in the input stream the state begins and where it ends. The position of an object means how far from the beginning of the state and from the end of the state it occurred.

Confidence: a rating related to the probability that a particular state occurred in a particular position and the support coefficient of said probability. Confidence equals Probability* Support Coefficient.

Support Coefficient: a rating related to how much information was available when calculating a given probability. It is possible to have a high probability, based on little information.

Figure 1:
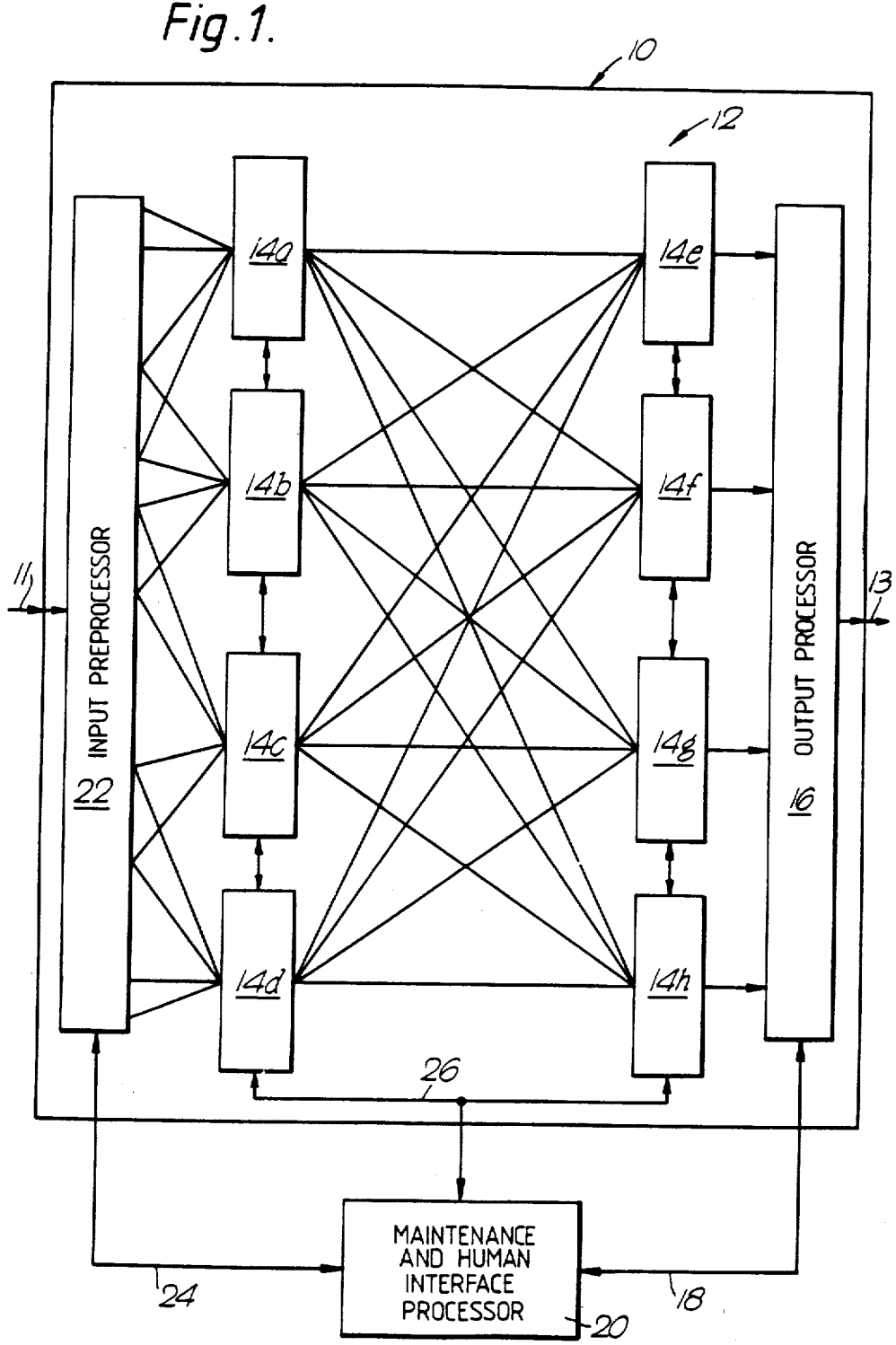
FIG. 1 is a simplified block diagram of a PLS including an array of PLE's in accordance with the present invention.

Referring to FIG. 1, there is shown a block diagram of a trainable PLS 10 formed of an array 12 of trainable PLE's constructed in accordance with the present invention. The PLS includes an input 11 for receiving objects and an output 13 for outputting recognized states. The array 12 of PLE's 14a to 14h is configured as a two dimensional array of elements, each of which operates according to its own set of multi-dimensional databases. Values for the databases are obtained from the external environment and from outputs which comprise the results of the overall system operation. An output processor 16 also includes a feedback interface portion coupled to a bidirectional bus 18 which is adapted to feedback output information to a maintenance and human interface processor 20. The interface processor 20 also intercouples data from an input preprocessor 22 and the array 12 on bidirectional busses 24 and 26 to provide feedback paths not only between the output processor 16 and the trainable array 12, but also between the input processor 22 and the trainable array 12 via the maintenance and human interface processor 20.

Prior to discussing the operation of the PLS 10, which comprises an array 12 of PLE's 14a to 14h, it should be understood that a PLS may consist of only one PLE if it has sufficient capacity for the assigned task.

A PLE inputs a sequence of objects and outputs a sequence of states which it learned from past experience to be the state sequence most closely associated with the input object sequence. The confidence which the PLE has in the association is indicated by assigning a rating to the output state sequence. This recognition function is shown most clearly in FIG. 2. The learning function could be illustrated by reversing the arrow now pointing to the output state sequence and ignoring the confidence rating.

In keeping with the task independent goal of the PLS there is no inherent meaning associated with an input object or an output state, they are members of finite sets. The input and output may in fact be the same set, but this is transparent to the system. The number of unique objects and states appearing in the task does however effect the database size of each PLE.

Figure 2:
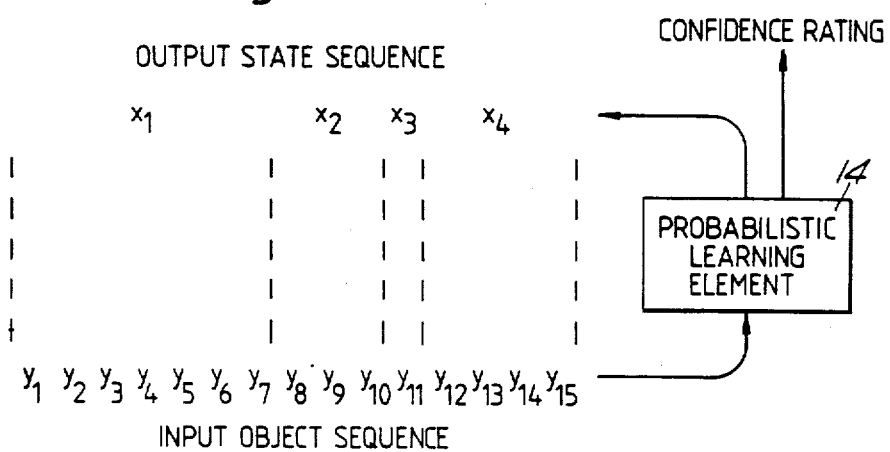
FIG. 2 is a diagram showing the recognition function of a PLE.

Although much of PLE's processing power, generality, and speed can be attributed to statistical modeling of its environment and the organization of that model in memory, the basic idea behind the modeling is simple. A sequence of objects as shown in FIG. 2 is learned and modeled by counting the n-grams of objects making up the sequence, where an n-gram is defined simply as a subsequence of n objects. Thus after learning, the element knows how often each object (1-gram) appeared in any sequence for each state, how often each pair of objects (2-gram) appeared in any sequence for each state, and so forth up to a specified limit of n. If D is the number of different objects there can be as many as D to the power of n different n-grams. However, the number is limited by the realities of a pattern recognition task. The size of D is determined by the feature extractor and the number of unique n-grams is determined by the states being recognized. Typically a finite set of states uses only a small fraction of the pattern space (e.g., this is true in speech recognition and optical character recognition).

The identity and frequency of n-grams are stored in databases in a context organized manner for long term memory. We call the databases that are organized in this manner Context Organized Memories or COM's. This type of memory storage is a modified tree structure in which each node represents a particular n-gram and is the parent node of all (n+1)-gram nodes that share the same first n objects. In addition, each node is linked to an (n−1)-gram node which represents the same object sequence with one less object at the beginning of the sequence.

Figure 3:
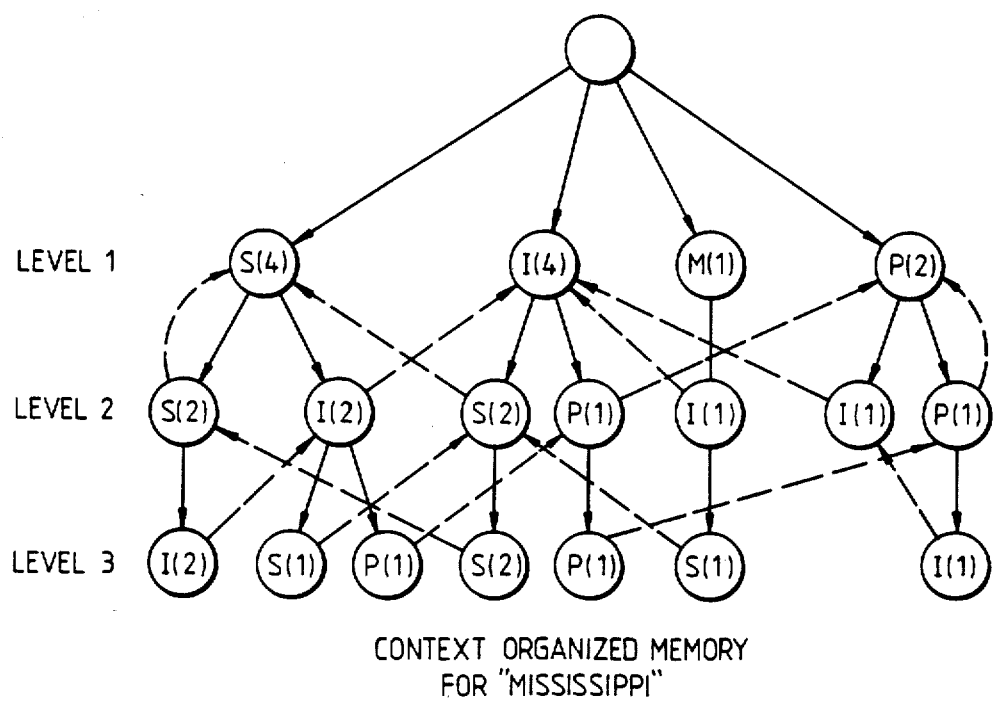
FIG. 3 is an example of a context organized memory.

FIG. 3 gives an example of a COM in which the object n-grams are composed of letters for the word "MISSISSIPPI". For "MISSISSIPPI" there are four objects i.e. S, I, M, P, therefore, D=4 and the highest level n-gram shown is a 3-gram for n=3. The objects on the path to a node at level n define the n-gram represented by the node. The number stored at the node is the frequency count of the n-gram. The dotted lines show links to the related (n−1)-grams. For example, the 3-gram "SIS" has occurred in the training once and it is linked to its unique 2-gram "IS".

The COM supports an efficient Context Driven Search. The memory arranges the objects so that the set of objects which statistically occur next in context are directly accessible from the current point or node in the structure. If the next input object does not match any of those in the expected set, the next position searched in the structure corresponds to the less specific context obtained conceptually by deleting the oldest object and algorithmically following the link to the (n−1)-gram node. At level n the greatest number of nodes expanded (i.e., searching all sons of a node) before the next object is found will be n. This corresponds to the case when the new object has never been found to follow any subpart of the current n-gram and the search must "drop all context" to find the object at level 1. An important feature of Context Driven Searching is that the average number of nodes expanded per input object is two. This is obvious if we remember that every failed node expansion (decreasing level by one) must be matched by some successful node expansion (increasing level by one) since the search remains within the finite levels of the tree.

The data structure of a PLE consists of four major long term databases and their supporting structures and a number of short term memories which will be discussed subsequently. The long term memories are COM's which may comprise one or more connected or associated tree structures. The COM's of the four major databases are indexed by object, state, length, or state-length.

The object database comprises a plurality of tree structures wherein the nodes of the trees each have an attribute list. One tree is called an alltree while the other trees of the object database are called singletrees. There are singletrees for each previously learned state, i.e. each state has its own object indexed singletree. Associated with each node of the alltree is an attribute list which acts as a pointer to all singletrees that include the same context as that of the alltree node. Thus, for every singletree there is a corresponding place in the alltree and that place in the alltree has an attribute list pointing to the place in the singletree.

Each node in the alltrees provides a record with these components:

(1) The additional object that this node represents.
(2) The frequency of occurrence of this pattern among the learned sequences of patterns. This occurrence is based not only on the object in this node but on the pattern of the nodes above it that point down to it.
(3) A calculated value from (2) derived by taking the logarithm value of (2) then multiplying by a constant. This operation maps the integer occurrence values to the integer range of zero to a predefined upper bound.
(4) A calculated value from the nodes under the current node. It is a measure of the usefulness of the information represented by those nodes. This value is called the support coefficient and is initialized as $-1$ to indicate that no valid data stored here. Each time a node is updated, its support coefficient is also reset to $-1$ to indicate that the support coefficient is not updated yet. This value is calculated when it is requested the first time after last update. The value is then stored in the node. And this value is valid till the next update.
(5) The pointer to the node which represents the same correlation information except the last object. And its object is greater than the object of this node.
(6) The pointer to the node which represents the same correlation information and with one more object. This is called one level deeper. There may be more than one such node. The one that down pointer points to is the one with the smallest object.
(7) The pointer to the node which represents the same pattern except it is one level higher. That is to say it does not have the oldest object.
(8) The pointer to the node which represents the same pattern without the last object. That node is also one level higher.

Singletrees are similar to alltrees in structure and purpose. The only difference in structure is in the attribute lists and the only difference in purpose is that an alltree contains pattern information independent of output state recognized, and a singletree contains pattern information concerning a single output state. Thus, an alltree may contain the cumulative of several singletrees. In the described embodiment we use one alltree to contain and control all the singletrees in the object database.

The entries of singletree attribute lists represent detailed correlation information for the state represented by the singletree for the node with which it is associated. It has four components:

(1) The number of objects (distance) in front of the object this node represents. This provides the distance from the beginning of the state to the current node.
(2) The number of objects (distance) from the object of this node to the end of the state.
(3) The number of times this object in this position has been learned.
(4) The calculated data from (3). The same calculation as done in (3) of alltrees.

The state, length and state-length databases each comprise one singletree structure indexed by state, length and state-length respectively. These singletrees do not have attribute lists as do the singletrees of the object database but the type of information stored at each node are similar to that stored in the object database tree.

When a COM is used to store the frequency of object n-grams forming parts of states the storage is efficient since only one tree is used for all states. An n-gram which appears in more than one state is stored once and details within the attribute list for the node list the proper states together with separate frequency counts.

Learning the next object in a sequence is simply a matter of creating a new node in the tree whenever the object appears in a new context or incrementing a frequency count when it appears in a previously learned context. The object is learned in all possible contexts from the $(n-1)$ gram preceding it for some maximum n down to a null context in which the object is recorded by itself as a 1-gram.

The databases are arranged to store five different types of knowledge. The five types of knowledge that are modeled by the PLE and stored in COM's are as follows:

Type 1: The frequency of object n-grams forming parts of all possible states; this knowledge is stored at the nodes of the alltree.

Type 2: The position and positional frequency of object n-grams within states; this knowledge is stored in the singletree attribute lists of the object database.

Type 3: The frequency of n-grams composed of states (i.e. for states T and A a 2-gram of states would be TA); this knowledge is stored in the nodes of the singletree of the state database.

Type 4: The frequency of n-grams composed of state lengths (i.e., the lengths of the underlying object sequence for state lengths of 4, 3 and 5 a 3-gram of state lengths would be 435); this knowledge is stored in the nodes of the singletree of the length database.

Type 5: The frequency of n-grams composed of state-length pairs, which knowledge is stored at the nodes of the state-length database.

Consider an object 4-gram, $y_1y_2y_3y_4$, stored at node j and let $f_j$ be the frequency of occurrence of the 4-gram and $f_i$ be the frequency of occurrence for its parent node, a 3-gram. Then the conditional probability that object $y_4$ will occur in the context of $y_1y_2y_3$ is given by the maximum likelyhood estimate:

$$P(y_4|y_1y_2y_3) = f_j/f_i. \quad (1)$$

This is the probabilistic basis for pattern matching in the PLE. The following types of conditional probabilistic knowledge maybe retrieved from the COM's using the above knowledge types:

P1. The probability that object $y_t$ will occur given the previous object context and state $X_i$, from the nodes of the singletree in the object database.

P2. The probability that object $y_t$ will occur with beginning position f, ending position g, given previous object context with consistent positioning and state $x_i$, from the singletree attribute lists in the object database.

P3. The probability that state $x_i$ will occur given previous output states, from the nodes of singletree in the state database.

P4. The probability of state length $L_j$ given lengths of previous output states, from the nodes of the singletree in the length database.

P5. The probability of state and length $x_i$, $L_j$ given previous sequence of state-length pairs, from the nodes of the singletree in the state-length database.

These probabilities will be more formally defined and derived subsequently.

Note that the sequence of state-length pairs is given as much attention by PLE modeling as the states themselves. This was done to permit the PLE to extract all relevant information from its environment so that it could decide what was needed to perform a task. In some pattern recognition tasks such as Morse code recognition or music classification the length of object sequences may be as important as the identity of the objects or the states. The PLE has the ability to use the information which is most helpful for the recognition task being performed.

The databases also include short term memory capability for storing the five types of knowledge that have recently been observed. The recently observed knowledge is correlated with the five types of knowledge that have been experienced, modeled and stored in COM's for long term memory in order to assign probabilities to possible output states. Short term memories build up and maintain the context in which the next object is handled. This saved context includes pointers into the trees of the COM's of long term memory.

Using the conditional probabilities retrieved from the COM's the following two basic probabilities are computed for all states and lengths previously stored in the COM's each time a new input object is received:

1. Input Probability: the probability that an input object sequence beginning at time b will occur and span a state given that it will end at time t and that the state will occur;

2. Predict Probability: the probability that a state and length will occur given that a previous sequence of states and lengths have occurred.

Figure 4:
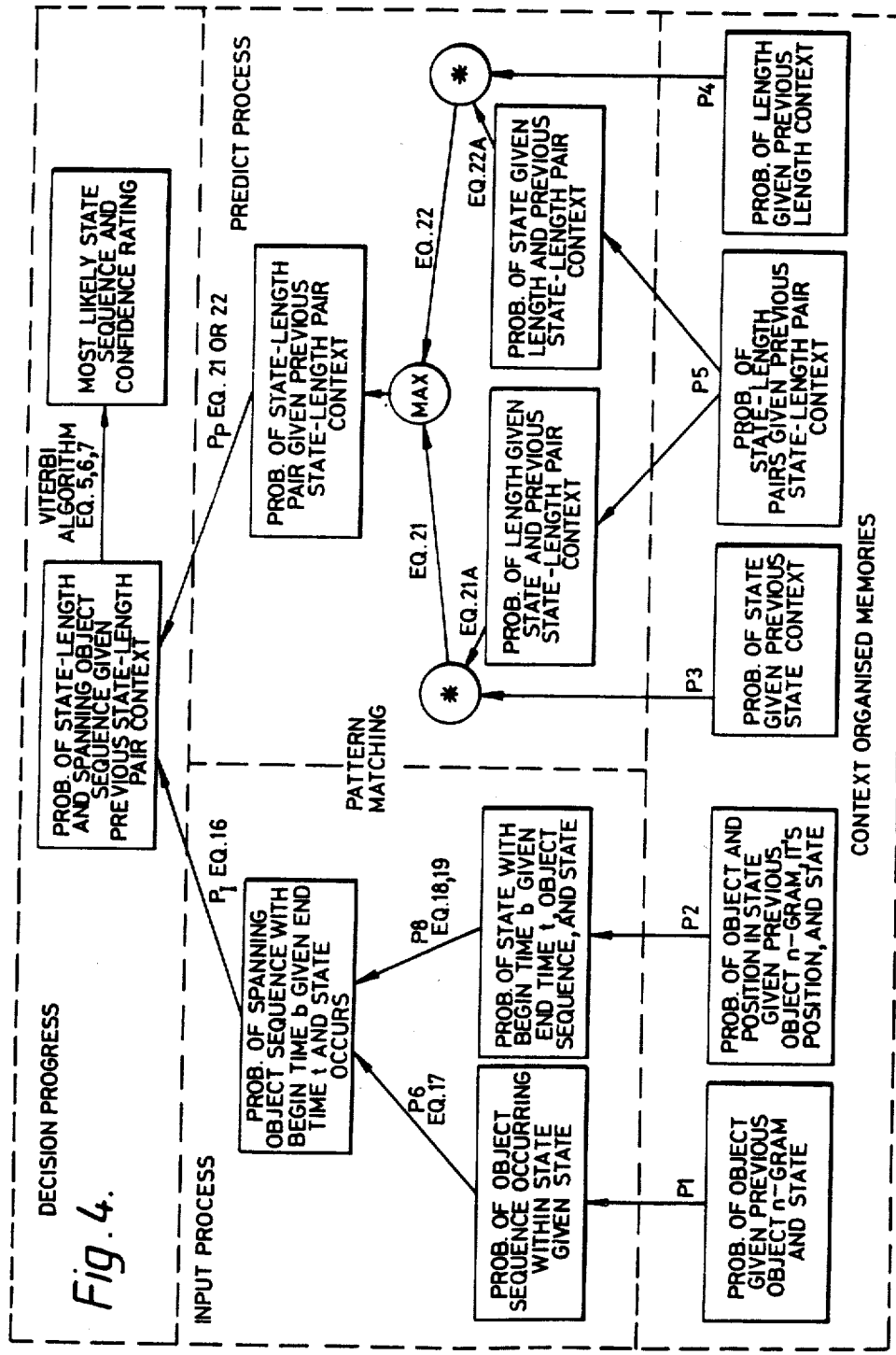
FIG. 4 illustrates the probability computating process in a PLE and also illustrates the relationship of the major subroutines of a PLE with respect to probability computations.

FIG. 4 shows the Input and Predict processes that compute these probabilities. Since mathematical details will be given subsequently, only an overview about these processes is discussed here. Probabilistic knowledge type P2, introduced above as the conditional probability of an object and the object's position, would be sufficient by itself for obtaining the needed input probability if enough training data could be guaranteed. However, in real recognition tasks the knowledge is too specific to stand alone. For example, if n-gram 'bacb' at a position of 5 objects from the beginning and 2 objects from the end in state S is highly likely to occur if state S occurs then it is likely to occur in other positions when state S occurs given any noise or uncertainty in the input. But if the n-gram occurs in some yet unobserved position, probabilistic knowledge type p2 will give no support for state S occurring based on n-gram 'bacb'. For this reason n-gram frequencies for a state are learned independent of position as probabilistic knowledge type P1. Probabilistic knoWledge type p2 is used only to estimate the probability of a states beginning time given an ending time, the intervening object sequence, and the state. Thus, probabilistic knowledge type P2 segments the input and probabilistic knowledge type P1 identifies it.

Similarly, in the predict process probabilistic knowledge type P5 containing the probability that a state with a particular length (state-length pair) occurs given that a previous sequence of states and lengths have occurred is very specific and would require a large amount of training and memory to be useful by itself. However it does supply the relationship between states and lengths (e.g., if state S occurs it will have length L with probability p, or if length L' occurs it will be state S; with probability p'). Probabilistic knowledge types P3 and P4 give predictions of state and length respectively based on more context and are combined with probabilities from probabilistic knowledge type P5 to find the best predictor of each state length pair.

The two basic probabilities, Input and Predict, are used in the PLE decision process. From the input and predict probabilities at each object input time, t, the decision process computes the probability that a state and a length and the input object sequence spanning the length ending at t will occur given past context. These probabilities are combined over time using the Viterbi Algorithm to compute the k most likely state sequences ending at time t, for some k. The most likely statesequence ending at final time T is the recognized state sequence.

The foregoing discussions of the use of-probabilities in the PLE will now be expanded to include another important PLE concept. In any human decision at least three factors come into play when assigning a confidence to the decision that is finally made:

1. How much do I trust my input information about the current circumstance?;

2. How well do the circumstance match the circumstance for previous decision experience I have had?; and 3. How much experience have I had and do I trust it?

The PLE attempts to use the last two factors to make a decision and to compute a rating of confidence in its decision. The PLE assumes that the input object sequence is completely reliable and therefore does not use the first factor. It is understood that this constraint may not always be true. The second factor corresponds to the two basic correlation probabilities and the decision process.

The third factor is implemented by computing a 'coefficient of support' for every conditional probability obtained from the COM structures. For a particular condition (i.e., context) the coefficent measures how diverse the experience has been and varies between 0 and 1 as the support ranges between no support (experience shows random chance) to complete support (no other possible choice). In addition, the support coefficient measures the amount of experience under each condition.

The support coefficients are combined together throughout the computation of the final probability to obtain an overall confidence rating for the probability of the recognized state sequence. The confidence rating is passed on to the interface processor 20 shown FIG. 1 for PLS array or to a learning supervision circuit which decides whether or not to learn to associate the output state sequence with the input object sequence. This decision is based on a threshold test of the confidence rating or external reinforcement. External reinforcement may be either from another PLE, as in an array, or from a human operator. The reinforcement may also include corrections to some of the state and boundary decisions made by the PLE. These corrections are passed on to the PLE databases before the COM's are updated by a command from the learning supervision circuit.

This type of correlation of conditional probabilities derived from learned experience allows the PLS to be general purpose in nature. To preserve this general purpose nature of the PLS, part of the representation for each specific task will be in the input preprocessor 22 designed for that recognition task and shown in FIG. 1. This will allow the PLS to be independent of special purpose aspects of application problems since often the representation are problem-specific.

The folloWing describes in detail the computations performed by the PLE to assign the most likely sequence of states to a sequence of objects given the probabilistic knowledge stored in the COM's. Referring to FIG. 2 let $y_1, y_2, \ldots, y_T$, or more compactly, $y(1:T)$, be an input sequence of objects to the PLE during time units 1 through T, and $x(1:R)$ be the output sequence of recognized states. Since an output state is represented by one or more input objects, R is less than or equal to T. Let $b(1:R)$ be the mapping of input objects to output states such that $b_r$ gives the time unit of the first object for state $x_r$. Thus, $$1 \leq b_i < b_j \leq T \text{ for } 1 \leq i < j \leq R \tag{2}$$

The task of the PLE is to find R output states $x(1:R)$ with boundaries in the input sequence of $b(1:R)$ for a given input object sequence $y(1:T)$ such that $P(x(1:R), b(1:R) | y(1:T))$ is maximized.

By Bayes' rule $$P(x(1:R), b(1:R) | y(1:T)) = \tag{3}$$

$$\frac{P(x(1:R), b(1:R)) * P(y(1:T) | x(1:R), b(1:R))}{P(y(1:T))}$$

But since $y(1:T)$ is constant over any one recognition task we can obtain the same solution by maximizing the numerator:

$$P(y(1:T), x(1:R), b(1:R)) = P(x(1:R), b(1:R)) * P(y(1:T) | x(1:R), b(1:R)). \tag{4}$$

It is not computationally practical to compute equation 4 for all possible sets of $[R, x(1:R), b(1:R)]$. Therefore the restrictions of a more specific model are applied. The model used by the PLE is that the object sequences within a state, the sequences of states, the sequences of state lengths, and the sequences of state-length pairs represent probabilistic functions of Markov processes.

Specifically it is assumed that:

1. The conditional probability that object $y_t$ given $y(t-c_1:t-1)$ and state $x_r$ is independent of t, r, $x(1:r-1)$, $x(r+1:R)$, and any other y's for some context level $c_1$ determined by the training of the PLE;

2. The conditional probability of state $x_r$ depends only on $x(r-c_2:r-1)$ for some context level $c_2$;

3. The conditional probability of length $L_r = b_{r+1} - b_r$ depends only on $L(r-c_3:r-1)$ for some context level $c_3$; and 4. The conditional probability of $(x_r, L_r)$ depends only on $(x(r-c_4:r-1), L(r-c_4:r-1))$ for some context level $c_4$.

We are using what might be called variable order Markov processes since for each Markov STATE (i.e. object, output state, length or state-length pair) of these four Markov processes the context level c varies depending on training of the PLE. The order of a Markov process is given by the number of previous STATES effecting the current STATE. We will use "STATE" in bold type to differentiate a Markov STATE from an ouput state of the PLE. Now, an nth order Markov process is equivalent to some first order Markov process with an expanded STATE space. In fact, the learning process using the COM of the PLE maintains such a STATE expansion automatically. For example each node on the COM object tree can be viewed as representing a STATE of the Markov chain encoding a particular n-gram of objects. The transitions to all possible next Markov STATES is given by the links to all sons of the node. These sons encode (n+1)-gram of objects. New Markov STATES are added as new n-grams are observed and deleted as transitions to them become improbable.

Given the above Markov assumptions, a simple method for finding the most likely set $[R, x(1:R), b(1:R)]$ for a given $y(1:T)$ is a dynamic programming scheme called the Viterbi Algorithm.

Let $W(t,k)$ be the kth most likely sequence of states $x(1:r)$ that match input $y(1:T)$ up to time t. Let $$G(t,k) = P(W(t,k)) = P(y(1:t), x_k(1:r), b(1:r), b_{r+1} = t + 1) \tag{5}$$

denote the probability of the kth best sequence. The term $b_{r+1}$ is included to make explicit that the last state $x_r$ ends with object $y_t$. The goal of the PLE is to determine $W(T,1)$.

$W(t,k)$ can be shown to be an extension of $W(t',k')$ for some $t' < t$ and $k'$. Specifically, $$G(t,k) = kth\text{-}max \\ [G(t',k') * P(y(b_r:t), x_r, b_r, b_{r+1} = t+1 | x(1:r'), b(1:r'))] \\ t' < t, k', x_r \tag{6}$$

where $r'$ is the number of states in the k'th best sequence ending at time $t'$ and $r = r' + 1$ is the number of states in the kth best sequence ending at time t. Computing the best k sequences rather than only the best sequence to time t permits a non-optimal $S(t,k)$ to be part of the final sequence $S(T,1)$ if $S(t,k)$ is supported by the context of later states. Thus context learned in a forward direction as $P(x_r | x(r-c:r-1))$ has an effect in a backward direction as $P(x_{r-c} | x(r-c+1:r))$.

Equation 6 is computed in the decision process using $$P(y(b_r:t), x_r, b_r, b_{r+1} = t + 1 | x(r-c:r-1), b(r-c:r-1)) = \tag{7} \\ P(y(b_r:t), b_r | b_{r+1} = t + 1, x_r) * \\ P(x_r, b_{r+1} = t + 1 | x(r-c:r-1), b(r-c:r-1)).$$

where $r-1$ has replaced $r'$. The left and right terms of the product are the Input and Predict probabilities respectively. These were discussed and appear in FIG. 4 as the output of the Input and Predict processes. Hereinafter we will discuss the computation of the Input and Predict probabilities, but first we will derive the support coefficient used in these computations.

In explaining the support coefficient we want to do four things: describe what a support coefficient is, show how it is used to compute a confidence rating, show how support coefficients are combined, and describe how support coefficients permit the PLE to weight its knowledge according to its experience.

Let p(1:n) be the estimated probability vector for the occurrence of n mutually exclusive events. Therefore the n probabilities equal 1. The remaining uncertainty about what event will occur in terms of bits of information is given by the entropy measure:

$$H(p(1:n)) = -\Sigma p_j \log p_j \tag{8}$$

Let us assume that the probability vector gives an accurate although perhaps incomplete description of reality concerning the n events.

The fraction of information supplied by the probability vector of the total information needed to correctly predict what event will occur is given by:

$$S(P) = 1 - \frac{H(p(1:n))}{\log n} \tag{9}$$

We call this fraction the support coefficient since it measures the amount of support given by the probability vector towards making a decision. The support coefficient is 1 when the probability of one of the events is 1. Its value is 0 when the probability of all events are equal.

Let $p_{i,j}$ represent the probability of event j obtained by some estimator i and $S_i$ be the support coefficient for the estimator computed from the probability vector it produced. We use $p_{i,j} * S_i$ as a measure of confidence in a decision that chooses event j as the one that will occur. The PLE uses this measure of confidence in four areas:
1. To chose between various conditional probabilities assigned to an object based on different levels of context;
2. To chose between state-based and length-based estimates of the predict probabilities;
3. To chose in the decision processes the kth best state sequence ending at time t in equation 6. Thus equation 6 should be amended with—'where the kth max is determined by'
kth-max [G(t',k') * P( . . . . ) * S(G(t',k') * P( . . . ))]. (10)

4. And to indicate to the learning supervisor the confidence it has in the final decision.

The combining of support coefficients from different probability vectors to obtain the support coefficient for their joint distribution is quite simple. It can be shown that for probability vectors p and q each of length n:

$$H(p*q) = H(p) + H(q). \tag{11}$$

From which it follows that:

$$S(p*q) = (S(p) + S(q))/2. \tag{12}$$

Extending this to more than two vectors gives a means by which the PLE can assign a support coefficient to the probability of a sequence of objects (or states) by averaging the support coefficients of the individual conditional probabilities of the objects (or states) making up the sequence.

A weakness of support coefficients as described to this point is that they do not measure the amount of experience behind the estimated probability vectors. For example, a probability vector of [0.8,0.2,0,0] for four events has a support coefficient of 0.64 according to equation 9, which does not distinguish whether the probabilistic estimate is based on frequency counts of [4,1,0,0,]or of [100,25,0,0]. Ideally the support coefficient would be higher in the second case than in the first. We will modify equations 8 and 9 to first put them in terms of frequency counts and then to incorporate the concept of experience.

The COM structures store frequency counts at each node for the object n-gram it represents (or state, length, or, statelength pair n-grams—depending on the knowledge type). The conditional probability, $p_j$ of the node is simply the ratio of the frequency count, $f_j$, of the node to the frequency count, $f'_i$, of its parent node. Thus, $$P_j = f_j/f'_i = f_j / \sum_{k=1}^{n} f_k \tag{13}$$

where the sum is over all sons of the parent node. Substituting equation 13 into equation 8, combining it with equation 9 and simplifying yields:

$$S(p) = 1 - \frac{\log f'_i - (1/f'_i) \sum_{j=1}^{n} (f_j \log f_j)}{\log N} \tag{14}$$

where N is the number of possible nodes (e.g., equal to the number of unique objects) and n is the number of existing nodes.

We can now incorporate the concept of experience by assuming that all non-existing nodes (objects not yet seen in the current context) occur with some finite frequency, u. The larger u is the greater the frequency counts of the existing nodes must be to achieve the same support coefficient. On the other hand, greater experience raises the support coefficient even if it does not change the conditional probabilities. Equation (14) now becomes $$S(p) = 1 - \frac{\log f''_i - \frac{1}{f''_i}\left((N-n) u \log u + \sum_{j=1}^{n} f_j \log f_j\right)}{\log N} \tag{15}$$

where the frequency count of the parent node, $f'_i$, has been replaced by:

$$f''_i = f'_i + u*(N-n).$$

The value of u does not have to be an integer. In the example given above, if u is set to 0.5 the support coefficient for the probabilities based on low frequency counts of [4,1,0,0] drops to 0.29. The support coefficient for the frequency counts of [100,25,0,0] remains almost unchanged at 0.63.

The Input probability is given by $$P(y(b_r,t),b_r|b_{r+1}=t+1,x_r) = P(y(b_r,t)|t,x_r) *$$
$$P(b_r|y(b_r,t),t,x_r) \tag{16}$$

As summarized previously the first term called probabilistic knowledge type P1 identifies the input and the second term called probabilistic knowledge type p2 segments the input.

The first term is obtained from $$P(y(b_r:t)|t,x_r) = P(y(b_r:t)|x_r) \quad (17)$$

$$= P(y_{b_r}|x_r) * \prod_{b_r < i \leq t} P(y_i|y(i - c_i:i - 1),x_r)$$

where $$c_{b_r} = \emptyset$$

and $$c_i = \underset{\emptyset < j \leq c_{i-1}+1}{\operatorname{argmax}} [P(y_i|y(i - j:i - 1),x_r)*S(P)]$$

Each $P(y_i|y(i-c_i:i-1),x_i)$ is a conditional probability obtained from the frequency counts stored at the nodes of the COM tree structure. The log of frequency counts are also stored at each node to permit efficient probability computations in the log domain. However this is an implementation issue and the math has been left in the non-log domain. The value $c_i$ determines equivalently: the level in the tree, the context in which the object $y_i$ is matched, and the conditional probability used for the object. It is chosen to maximize the confidence value of the decision which as explained above is equal to the product of the probability and the support coefficient. Equation (17) shows that the context level for the next object is limited to be no more than one level deeper than the best level of the current object.

The derivation of the second term containing the second probabilistic knowledge type will now be discussed. The frequency counts stored at a node in the COM object tree for a particular object n-gram are first divided between the states that were learned when the n-gram appeared (knowledge type 1) and then further divided between the various positions in which the n-gram appeared within each state (knowledge type 2). The position is given by two values: the number of objects preceding the last object of the n-gram; and the number of objects following the the last object plus 1. We call these values the "distance to beginning" and the "distance to ending". The sum of these values will always equal the length of the state (i.e., number of objects) at the time the pattern was learned.

Let $f_i$, and $g_i$ be the distance to beginning and ending respectively for the last object $y_i$ of n-grams appearing in patterns learned for state X. The probability that a object sequence $y(b:e)$ is a complete pattern for state X (i.e., both begins and ends the state) is estimated by $$P(y(b:e),b,e,|X) = (P(y_b,f_b = \emptyset,g_b = e - b + 1)* \quad (18)$$

$$\prod_{b < i \leq e} P(y_i,f_i = i - b,g_i = e - i + 1|y(i - c_i:i - 1),$$

$$f(i - c_i:i - 1),g(i - c_i:i - 1),X)^{1/L}$$

where $L = e - b + 1$ and $c_i$ takes on the same values of equation (17). The conditional probabilities returned by the tree are bounded below by a small positive value since in many cases there will be no learned examples of a particular n-gram, in a particular position, for a particular state. The effect of this "deficiency" in the training is removed by replacing zero probabilities with small probabilities, and normalizing by length by taken the Lth root of the product. These calculations take place in the log domain.

We can now compute the second term of equation (16) with $$P(b_r|y(b_r:t),t,x_r) = \frac{P(y(b_r:t),b_r,t|x_r)}{\sum_{b_r \leq i < t} P(y(i:t),i,t|x_r)} \quad (19)$$

The Predict probability (the second term of (7)) can be rewritten as $$P(x_r,L_r|x(r-c:r-1),L(r-c:r-1)) = P(x_r,b_{r+1}=t+ 1|x(r-c:r-1),b(r-c:r-1)) \quad (20)$$

where $L_r = b_{r+1} - b_r$ is the length of state $x_r$. This probability can be computed based on state predictions from probabilistic knowledge type P3 as $$P(x_r,L_r|x(r-c:r-1),L(r-c:r-1)) = P(L_r|x_r,x(r-c':r-1),L(r-c':r-1))*P(x_r|x_{4-c:r-1}) \quad (21)$$

or based on length predictions from probabilistic knowledge type P4 as $$P(x_r,L_r|x(r-c:r-1),L(r-c:r-1)) = P(x_r|L_r,x(r-c':r-1),L(r-c':r-1))*P(L_r|L_{r-c:r-1}) \quad (22)$$

For each state and length pair the method is chosen to give the maximum confidence value for the decision. The first term in each case is derived from the state-length COM tree structure probabilistic knowledge type P5 by summing over all lengths for a given state or all states for a given length as appropriate.

In equation (22) the first term is derived from the equation:

$$P(L_j|x_i,x(r - c':r - 1),L(r - c':r - 1)) = \quad (21A)$$

$$\frac{P(x_i,L_j|x(r - c':r - 1),L(r - c':r - 1))}{\sum_j P(x_i,L_j|x(r - c':r - 1),L(r - c':r - 1))}$$

In equation (21) the first term is derived from the equation:

$$P(x_i|L_j,x(r - c':r - 1),L(r - c':r - 1)) = \quad (22A)$$

$$\frac{P(x_i,L_j|x(r - c':r - 1),L(r - c':r - 1))}{\sum_j P(x_i,L_j|x(r - c':r - 1),L(r - c':r - 1))}$$

The context level c' of this tree is typically less than the context levels of the state and length prediction trees. If c=c' there is no advantage in combining in the state or length prediction information. In all trees the context level is chosen to maximize the confidence values of the conditional probabilities.

Figure 5:
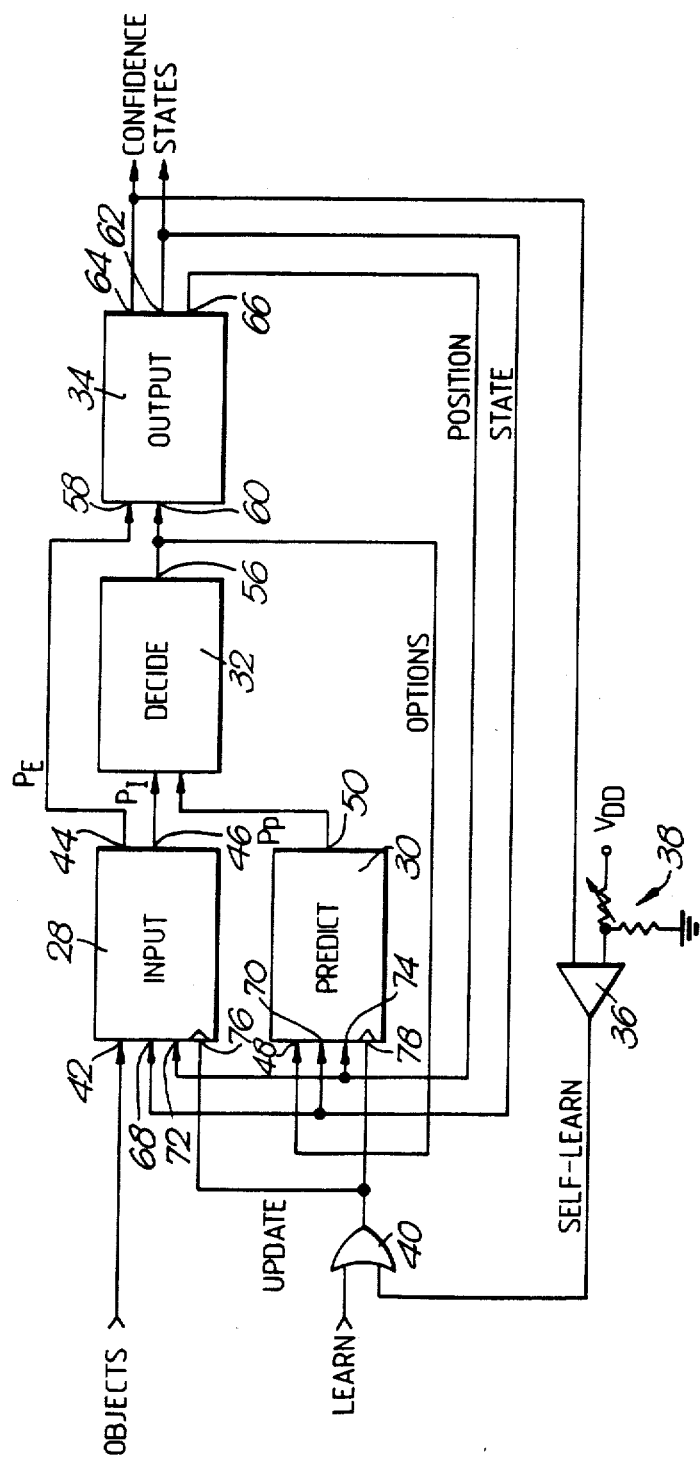
FIG. 5 is a simplified functional block diagram of a PLE in accordance with the present invention.

The following is a description of a physical embodiment of a PLE constructed in accordance with the present invention. Referring to FIG. 5 there is shown a block diagram of a PLE comprising four major modules, namely input module 28, predict module 30, decide module 32 and output module 34. A comparator 36 is also provided having one input connected to a variable divider circuit 38. An OR-gate 40 is provided having one input connected to the output of the comparator 36 and a second input connected to receive a learn signal.

Input information, in the form of objects enter the input module 28 at an input terminal 42. The input module uses the input objects to provide two kinds of probability information based on previously learned object sequences. At a terminal 44, the input module provides a signal $P_E$ corresponding to the probability that some state ends at the present time and this probability will be known as End-Of-State Probability. At a terminal 46, module 28 provides a signal $P_I$ corresponding to the probability that an input object sequence beginning at a time b, will occur and span a state given that it will end at time t and that the state will occur. This probability will be known as Input Probability $P_I$ and is derived using the previously discussed equation (16).

The predict module 30 receives Options Information at an input 48 from the decide module 32 and uses this information in conjunction with other information to calculate the most likely state-length pairs and their probabilities, which probability information is provided as signal $P_P$ at an output 50. The state-length pair probability information shall be known as Predict Probability and may be derived using the previously discussed equations (20), (21), and (22).

The decide module 32 includes a first input 52 for receiving the Input Probability signal $P_I$ from the input module 28 and a second input 54 for receiving the Predict Probability signal $P_P$ from the predict module 30. The decide module combines the Input and the Predict Probabilities to form the previously mentioned Options Information which is provided at terminal 56. The Options Information is derived using the previously discussed equations (5), (6) and (7) implementing the Viterbi Algorithm.

The output module 34 includes two inputs, 58 and 60 for receiving the End-Of-State Probability signal $P_E$ and the Options Information respectively. The output module accumulates the Options Information and utilizes the End-Of-State Probability to decide when the Options Information is sufficiently good to output a recognized state and its preceding states at a final time T at a terminal 62. The output module also provides an output at a terminal 64 corresponding to the probability that the state occured in a particular position and this signal is known as the Confidence Factor derived using equation (9) and the probability vector as previously discussed. The output module provides one additional output at a terminal 66 corresponding to the positions of the recognized state and the preceding states. The recognized states are fed back to the input and predict modules at terminals 68 and 70 respectively while the position information is fed back to the input and predict modules at terminals 72 and 74 respectively.

The Confidence Factor is applied to a second input of the comparator 36 so that when the level of the Confidence Factor exceeds a threshold established by the divider 38 a self learn signal is provided from the comparator 36 to an input of the Or-gate 40, which in response thereto provides an update signal to inputs 76 and 78 of the input and predict modules respectively. The second input of the OR-gate 40 is adapted to receive a learn signal. The learn signal maybe from a human interface processor, such as the one shown in FIG. 1. A human interface processor maybe used to provide human initiated reinforecement when the PLE is learning. Such a processor and its reinforcing function maybe used with a single PLE or a PLS, as shown in FIG. 1. The learn signal may also come from another PLE when a PLS is used.

The OR-gate 40 in response to either a learn or a self learn signal will cause an update signal to be provided to terminals 76 and 78 of the input and predict modules. When an update signal is received at terminal 76 and 78 of the input and predict modules, the current information being received from the output module and the objects that were received and stored in the input module Will be accepted as true and recognized states. The state and position information will be used to update COM's contained in the input and predict modules.

Figure 6:
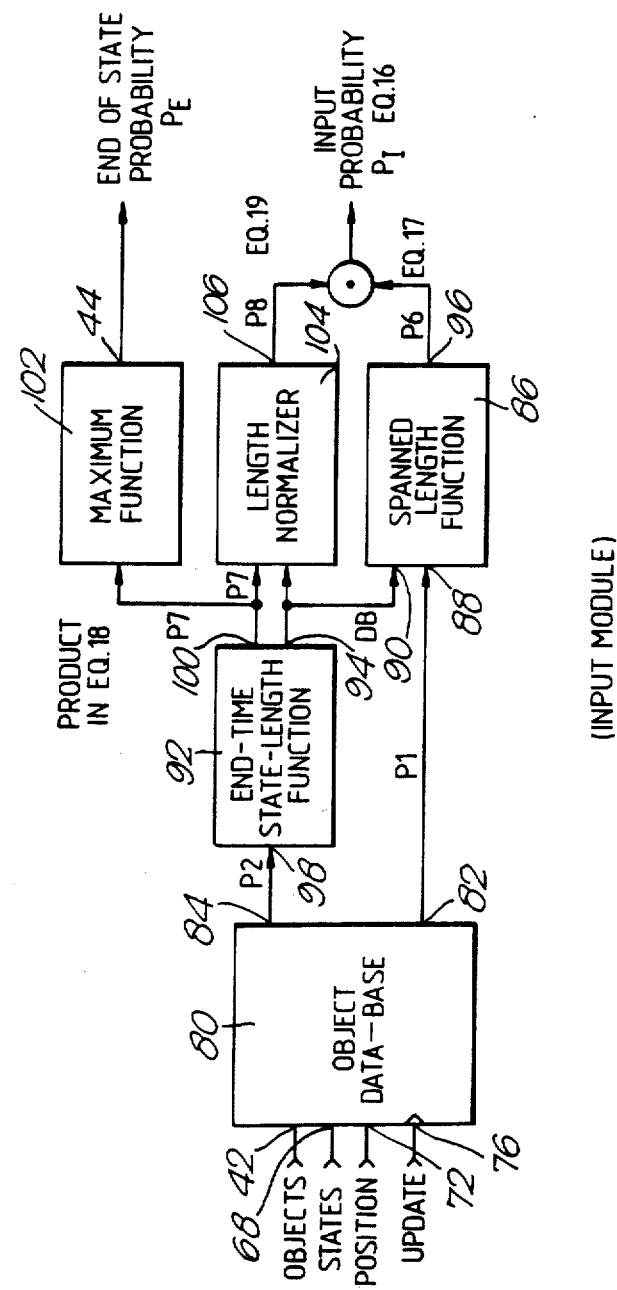
FIG. 6 is a block diagram of the input module shown in FIG. 5.

Referring to FIG. 6, there is shown a more detailed block diagram of the input module 28 of FIG. 5. An object database 80 includes short term memories and a plurality of COM's for long term memory as previously discussed. The object database has input terminals 42, 68, 72 and 76 for receiving the object information, the state information, and the position information and update signal respectively. The received object information is stored in the short term memory and is used to search in the long term memories. A first COM, called an alltree, within object database 80 stores the previously described type 1 knowledge, namely the frequency of object n-grams forming parts of all possible states. From this COM we receive pointers to appropriate singletrees from the nodes of which we receive the first type of probabilistic knowledge P1 at terminal 82, namely the conditional probability that object $y_t$ occurs given the previous object context or n-gram and state $x_i$. This conditional probability identified as P1 is independant of position within the state and is calculated for all significant states. The attribute lists of the singletrees are used to provide an output at terminal 84 corresponding to the conditional probability that object $y_t$ with beginning position f and ending position g will occur given the previous object context or n-gram with consistant positioning and state $x_i$. This conditional probability P2 is derived from the type 2 knowledge, namely the positional frequency of object n-grams within states and is calculated for all significant states and times that such states could end.

The conditional probability P1 from terminal 82 is provided to a spanned-length function module 86 by way of an input terminal 88. Module 86 also receives at a terminal 90 a signal DB from an end-time state-length function module 92 having an output terminal 94. Said signal DB corresponds to the distance back (DB) or to the begin time for each significant state-length. The spanned-length function module 86 stores the previously received P1 value and combines the currently received P1 value with the stored previous value. The sum is then stored and indexed by time to develop accummulated probabilities stored for vaious times. The module uses the DB input to calculate the difference between the accummulated probability at the current time and the accummulated probability at the time DB before the current time. This difference is then outputted at terminal 96 as a probability P6 that the sequence of objects between the begin time and the end time occurs for a given state. This probability is calculated using the previously discussed equation (17).

The end-time state-length function module 92 receives at terminal 98 the conditional probability P2 outputted from terminal 84. Module 92 outputs at terminal 100 the accummulated probability values as each end-time passes, said accummulated probability being the probability that the sequence back to some begin time occurs in the given state. This probability P7 is derived using the product found in equation (18), previously discussed.

The maximum value of the P7 probability will give the probability that some state ends at the present time. This maximum value of P7 is determined by the maximum value function module 102 which includes the output terminal 44 which provides the End-Of-State Probability $P_E$.

A length normalizer module 104 receives the outputs of module 92 and provides at a terminal 106 a signal P8 corresponding to the probability that the begin time is correct given the sequence of objects, the end-time and the state. This probability is calculated in accordance with the previously discussed equation (19).

The outputs of modules 86 and 104 are multiplied together to provide at terminal 46 the previously discussed Input Probability calculated in accordance with equation (16) wherein the results of equations (17) and (19) are multiplied together.

The end-time state-length function module 92 receives the previously discussed second type of conditional probabilistic knowledge P2 from the object database 80. The positional information stored in the database provides values for the number of objects preceeding the last object of the n-gram and the number of objects following the last object plus 1. These values are called the "distance to beginning" and the "distance to ending" and the sum of these values will always equal the length of the state at the time that the pattern was learned. The probability P7 that an object sequence is a complete pattern for a state is determined by the product found within the previously discussed equation (18), which defines the signal provided at terminal 100 of module 92.

Figure 7:
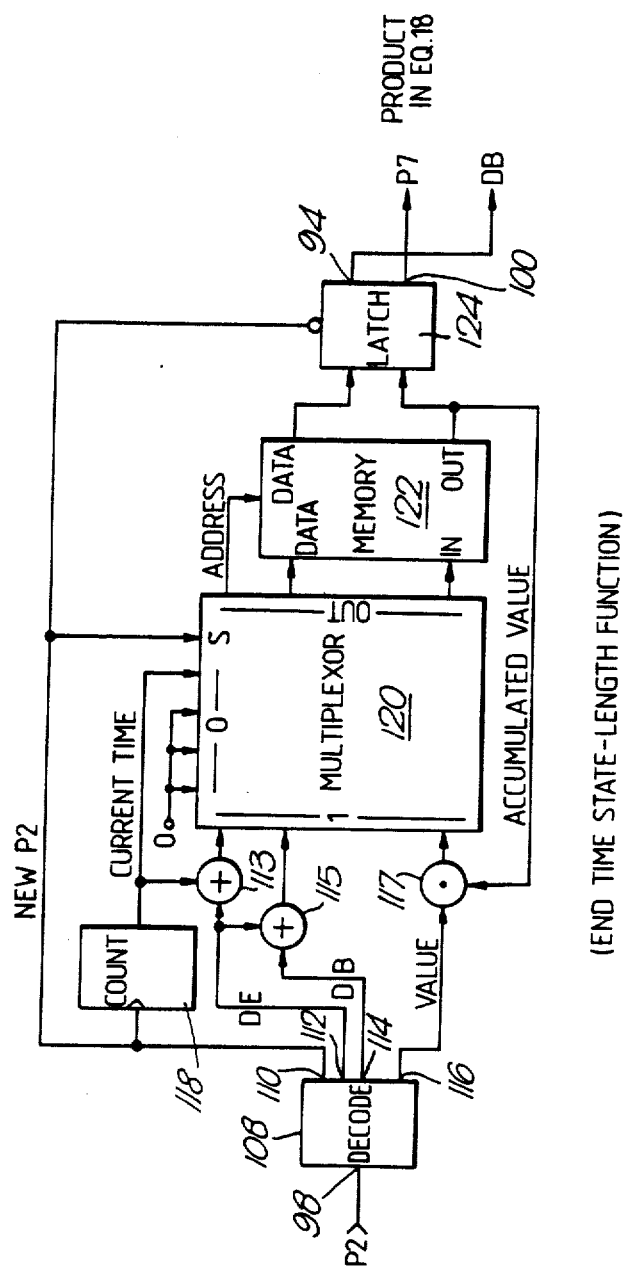
FIG. 7 is a block diagram of the end time state length function shown in FIG. 6.

Referring to FIG. 7, there is shown a detailed block diagram of the end-time state-length function module. Conditional probabilistic information P2 arrives at terminal 98 of a decoder 108. The decoder functions to separate the information received at the input and to provide a timing signal each time a New P2 signal enters at terminal 98. The decoder outputs the timing signal called New P2, a DE signal, a DB signal and a probability value at terminals 110, 112, 114 and 116 respectively.

A matrix of all possible state-lengths would be exceedingly large and most nodes would have zero entries. Dealing with such a large matrix would tax the memory capacity of the database; therefore, the significant states including their DB and DE information will be indexed by a common parameter q. Thus, at a given object time the information provided by the decoder 108 includes the New P2 timing signal, DE (q, state), DB (q, state) and probability value (q, state).

The New P2 timing signal is provided to a counter 118, a multiplexer 120 and a latch 124. The counter 118 increments each time a New P2 signal is received and provides a current time output which is a modular number based on how many addresses are needed in the memory to span the distance from the beginning to the end of the longest state.

An adder 113 is provided to add the current time to DE to provide a signal corresponding to end-time, i.e. current time plus distance to end equals "end-time". The DE signal is added to the DB signal by another adder 115 to provide a signal corresponding to "length". The probability value is multiplied in a multiplexer 117 by an accumulated probability value to provide a "product". The "end-time", "length" and "product" signals are applied to multiplexer 120 on the left side marked "1".

The top side of the multiplexer marked "0" receives three signals, two corresponding to 0 and one being the current time.

The multiplexer provides output signals on the right side marked "out". When the multiplexer receives a high level signal at a select input "S" from the New P2 signal, the multiplexer selects from the left side marked "1".

Memory 122 has an address input which receives a time signal corresponding to end-time or current time depending on the multiplexer output. Two data signals are inputted to the memory from the left by the multiplexer. The first data signal is either "length" or zero and the second is the "product" or zero depending upon whether New P2 is high or low.

When New P2 is high the multiplexer selects from the left and the memory address receives the value of the time when the state ends i.e. "end time". The memory stores the "length" (q, state) and the "product" (q, state). A read modify write operation is done on the memory to develop the accumalated value which is stored at the addressed "end-time".

When the New P2 signal goes low, the multiplexer selects from the top. Thus, the memory address input receives the current time and a second read modify write is done. Latch 124 is responsive to the low signal on New P2 so that the data values at the current time are latched and will be available at the outputs. The write operation provides a clearing of the information in the memory at the current time address since "0"s are written in. This prepares the memory for the next cycle of information. It should be noted that the data values were actually written for the "end-times" of the states so that when the current time reaches the "end-time" the "length" of the state is the same as the DB and the length information outputted from the memory corresponds to DB.

Figure 8:
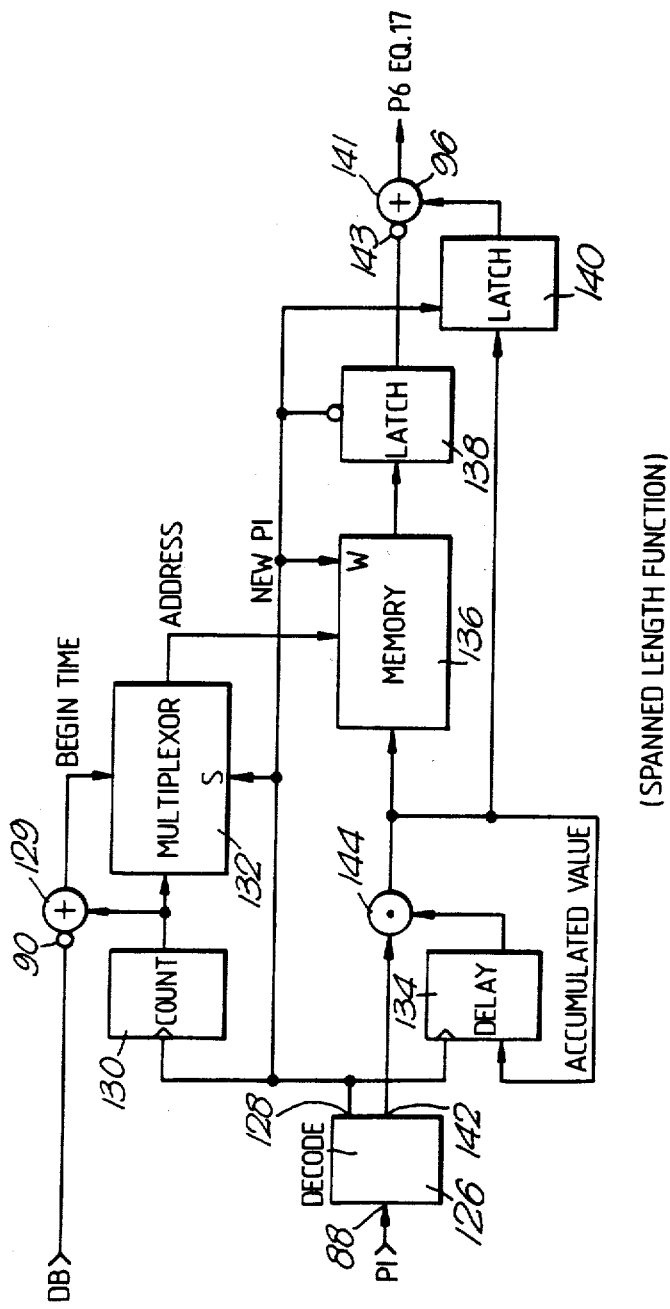
FIG. 8 is a block diagram of the span-length function module shown in FIG. 6.

Referring now to FIG. 8, there is shown a detailed block diagram of the spanned-length function module 86. As previously discussed terminal 88 receives the conditional probabilistic information P1 which enters a decoder 126. The decoder provides a timing signal New P1 at an output 128 when new probability information P1 is entered. The New P1 signal is provided to a counter 130, a multiplexer 132, a delay circuit 134, a memory 136, a latch 138 and another latch 140. The counter 130 in response to the timing signal New P1 generates a current time signal in a manner similar to that generated in the end-time state-length function module. The current time signal is applied to one input of the multiplexer 132 and to an add circuit 129. The DB signal from the end-time state-length function module 92 is provided to a terminal 90 which is an inverted input of the add circuit. Thus, the add circuit effectively subtracts the DB from the current time to output a begin time signal which is provided to another input of the multiplexer.

The multiplexer is controlled by the New P1 signal to provide either the current time or the begin time to an address input of memory 136.

When the New P1 signal is high the multiplexer 132 selects from the left and the memory is in a write mode. At this time, the memory is addressed by the value of the current time signal provided from counter 130.

Decoder 126 provides at a second output 142 a signal corresponding to the conditional probability P1, which output is connected to a first input of a multiplier 144 which multiplier has a second input connected to its output through the delay circuit 134 so that the output of the multiplier corresponds to the product of the probability value P1 multiplied by the accummulated value resulting from the product of previous inputted probability values. The output of multiplier 144 is connected to an input of memory 136 and an input of latch 140 where the current accumulated value is latched for use during the next New P1 low period and stored in the memory 136 and indexed at the current time.

When the timing signal New P1 is low the multiplexer selects the begin time signal which is the value of the count signal outputed from counter 130 minus the DB (q, state) received at terminal 90. At this time the memory 136 is reading and latch 138 holds the information corresponding to the accumulated value at the begin time that is read. The outputs of latches 138 and 140 are provided to an add circuit 141 with the output of latch 138 going to an inverted input 143 so that the output of the add circuit 141 on terminal 96 is really the difference between the inputs. Thus, the output at terminal 96 is the difference betweent the current accumulated value and the accumulated value that existed at a distance DB in the past i.e. at the begin time. The output at terminal 96 is derived in accordance with the previously discussed equation (17) and is identified as P6. It must be kept in mind that we are only interested in the difference and it is assumed that the borrow is possible and the value of the data in the memory may be allowed to overflow without penalty, provided that the memory was all the same value when the first object arrived and that the size of the data is higher than the largest difference possible.

Figure 9:
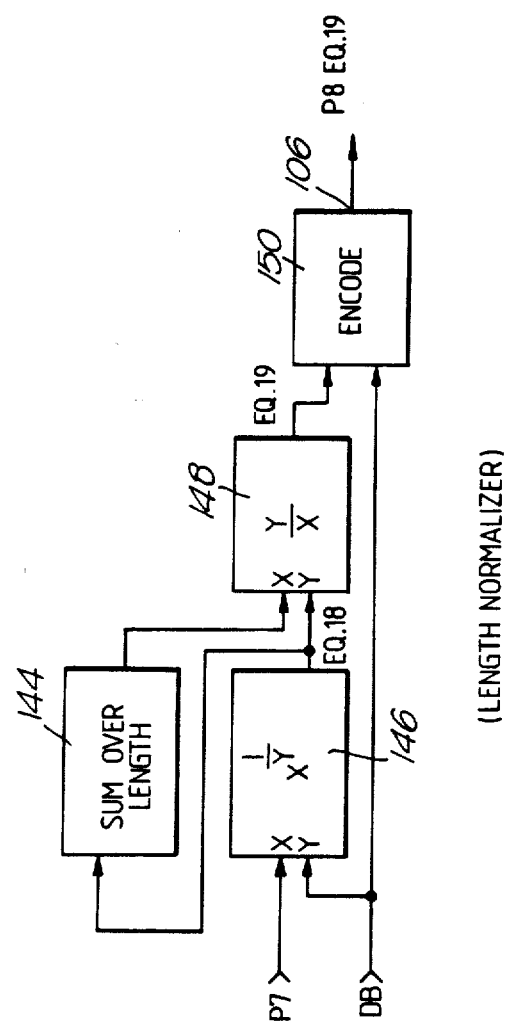
FIG. 9 is a block diagram of the length normalizer shown in FIG. 6.

Referring to FIG. 9, there is shown a detailed block diagram of the length normalizer 104, which receives the probability information P7 and the distance to begin DB information from module 92 and provides an output P8 in accordance with equation (19). Both the probability value P7 and the distance to begin value DB are provided to a module 146 which provides an output equivalent to the $X^{1/Y}$ or $P7^{1/Y}$ in accordance with equation (18). The output of module 146 is provided to a module 144 where all probability values for each (q, state) are added together to provide an output that is indexed only by (q, state). In order to do this summation the value of the probability which is a log function must be exponentiated after which the sum is taken. The log is then applied before the value is passed on. The outputs of modules 144 and 146 are provided to a module 148 where the output of module 146 is divided by the output of module 144. The result of this division is provided to an encoder 150 where it is encoded with the distanct to begin or length information. To provide an output P8 at terminal 106 in accordance with equation (19). The probability P8 is indexed by length and state with the parameter q being eliminated by the encoder.

Figure 10:
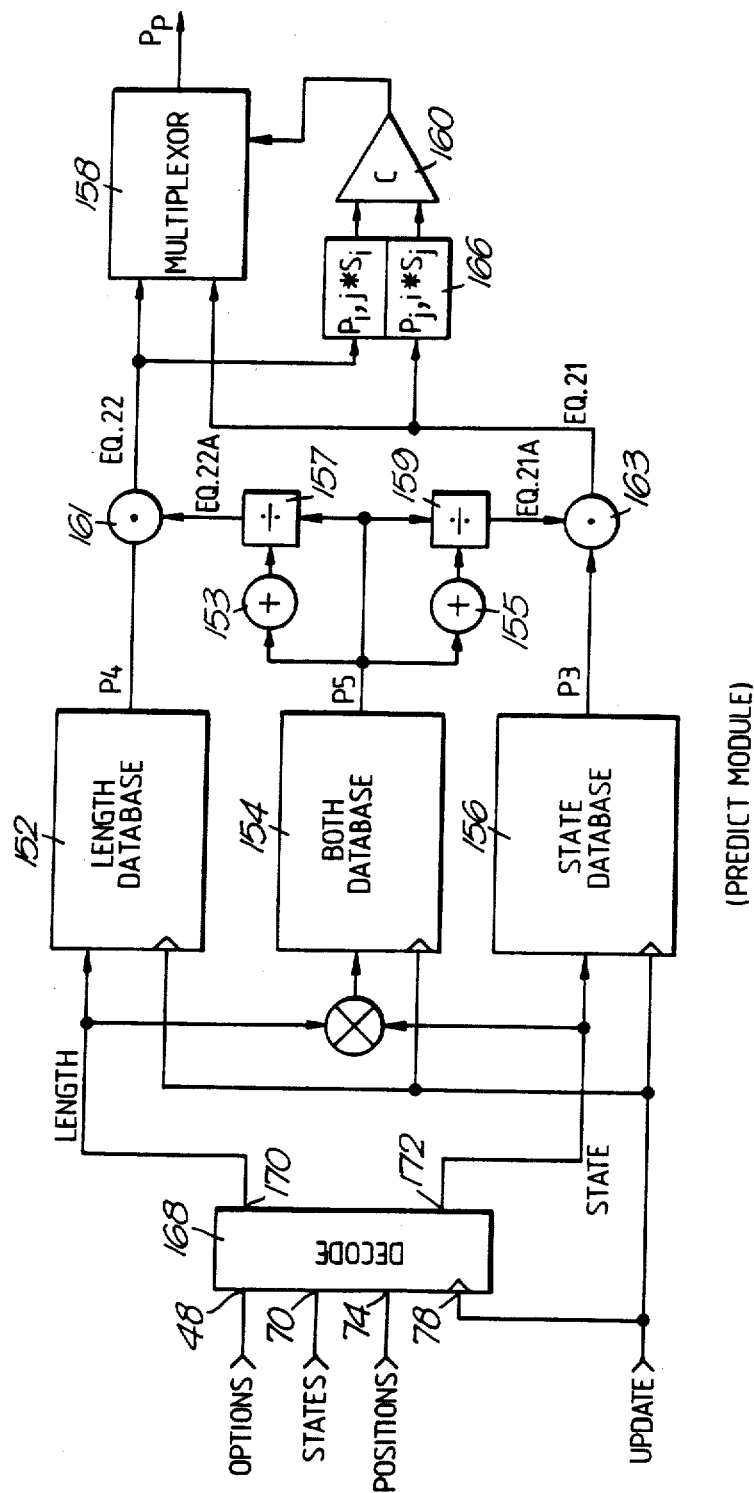
FIG. 10 is a block diagram of the predict module shown in FIG. 5.

Referring to FIG. 10, there is shown a detailed block diagram of the predict module 30 including a length database 152, a both database 154 and state database 156 all comprising separate COM's for storing the type 4, type 5 and type 3 knowledge respectively. A decoder 168 receives options information at terminal 48, state information at terminal 70, position information at terminal 74 and an update signal at terminal 78. The decode module separates the received information and provides at an output 170 length information and at an output 172 state information. The length database 152 receives the length information in the form of numbers of objects that make up states. The length information is organized by sequences of lengths for storage in a COM. The state database 156 receives state information which is organized by sequences of states in a COM. The both database 154 receives both length and state information which is stored in a COM and is organized by state-length pairs. The state database 156 provides a first output comprising all possible next states and their probabilities. The probabilities for the states are in the forms of the previously discussed type 3 conditional probabilistic information P3. The output of database 156 is provided to an input of a multiplexer 158. The length database 152 provides an output comprising all possible next lengths and their probabilities in the form of the type 4 conditional probabilistic information P4. The length database output is connected to another input of multiplexer 158. Database 154 provides an output comprising all possible next state-length pairs and their probabilities which probabilities are in the form of the type 5 conditional probabilistic information P5 previously discussed. The output information from databases 152 and 156 each include support coefficients corresponding to the usefulness of the probability information being provided by the respective database. The support coefficients are derived using equation (9).

The P5 information from the both database 154 is provided to summing circuits 153 and 155 where the probabilities of all states and all lengths are summed respectively. This is the same type of summing across that was done in the length normalizer. The outputs of the summing circuits 153 and 155 are provided to divider circuits 157 and 159 respectively. The P5 signal is also provided to dividers 157 and 159 so that the dividers each output a signal in accordance with equations (21A) and (22A) respectively.

The outputs of dividers 157 and 159 are provided to multipliers 161 and 163 respectively as are the P4 and P3 signals. Multipliers 161 and 163 output signals to multiplexer 158 in accordance with equations (22) and (21) respectively.

The output information including the probabilities and the support coefficients from multipliers 161 and 163 are provided to module 166 where the probabilities are multiplied by the support coefficients to provide confidence factors for both the state and length information provided to multiplexer 158. The confidence factor signals for state and length information are provided to a comparator 160. Comparator 160 provides an output depending upon which confidence factor is higher, this output controls the multiplexer 158 so that the output signal $P_P$ is selected from either equation (21) or (22) depending upon which has the higher confidence factor.

Figure 11:
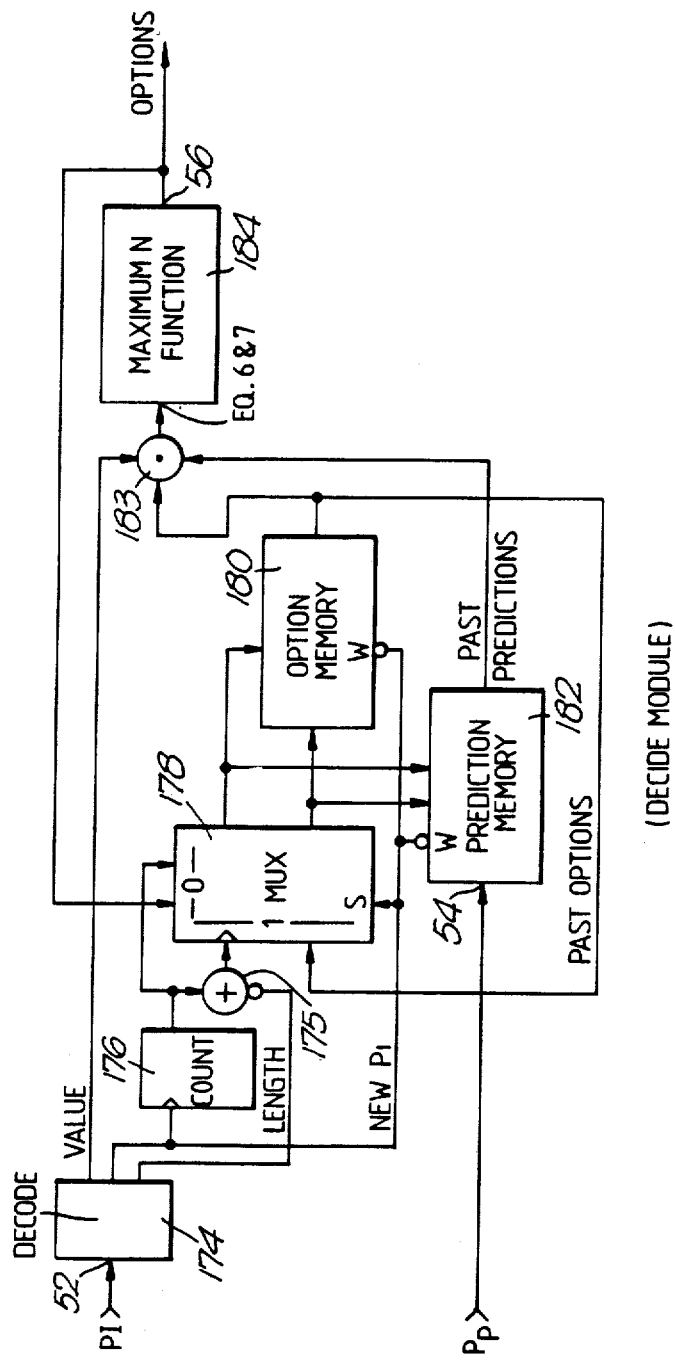
FIG. 11 is a block diagram of the decide module shown in FIG. 5.

Referring to FIG. 11, there is shown a detailed block diagram of the decide module 32. The Input Probability $P_I$ calculated in accordance with equation (16) is received at terminal 52 of a decoder circuit 174. The decoder circuit separates the Input Probability into its value and length and further provides a clock signal New $P_I$ when a new Input Probability arrives. The clock signal is provided to a counter 176, a multiplexer 178, an option memory 180 and a prediction memory 182. The clock signal New $P_I$ clocks the counter so that it provides an output corresponding to current time. The length information from the decoder 174 is provided to an inverting input of a summing circuit 175 where it is effectively subtracted from the current time to provide a signal corresponding to begin time which is provided to an input on the left or "1" side of the multiplexer 178. Multiplexer 178 also receives on the left side past options information from the option memory 180. The top or the "0" side the multiplexer receives current time and options information. The outputs from the multiplexer 178 are provided to both the option memory 180 and the prediction memory 182. The prediction memory 182 is addressed by the time, and the option data from the multiplexer.

Multiplexer 178 is clocked by signal New $P_I$ and first selects from the left when New $P_I$ is high which causes the option memory to be addressed by the current time minus the length information or the begin time. The output of the option memory is a list of options that were available at the addressed time or begin time. This list includes states, positions and probabilities at the addressed begin time. The output of the option memory is looped back and provided as a second input to the multiplexer 178 so that the past options data may be used to aid in the addressing of the prediction memory 182. The time from the multiplexer and the past options data both address the prediction memory for storage of the Predict Probability $P_P$ data received at terminal 54. The $P_P$ data consists of sets of states, lengths and probabilities.

The value information provided by decoder 174 containing input probability, the past options data from the option memory 180, and the past predictions data from the prediction memory 182 are multiplied together in 183 to implement equation (6) using equation (7). The first term in equation (7) is input probability, the second term of equation (7) is past predictions. Equation (7) is the second term of equation (6) and the first term is the past options from the option memory. The product of this multiplication is provided to a maximum N function circuit 184. The maximum N function circuit chooses the N best options based on their confidence levels. These options are outputted at terminal 56.

When the New $P_I$ timing signal goes low the multiplexer 178 selects from the top and the option memory is addressed at the current time. The write input of the option memory 180 is activated so that the current options from the maximum N function circuit 184 are written into option memory 180 through multiplexer 178 and are addressed at the current time. These current options and the current time also address the prediction memory 182 which is also write enabled by the New $P_I$ low to store the Predict Probability data for future use.

The size of both of the memories 180 and 182 and the counter 176 must be sufficient to span the length of the longest state plus the options needed to specify their history.

Figure 12:
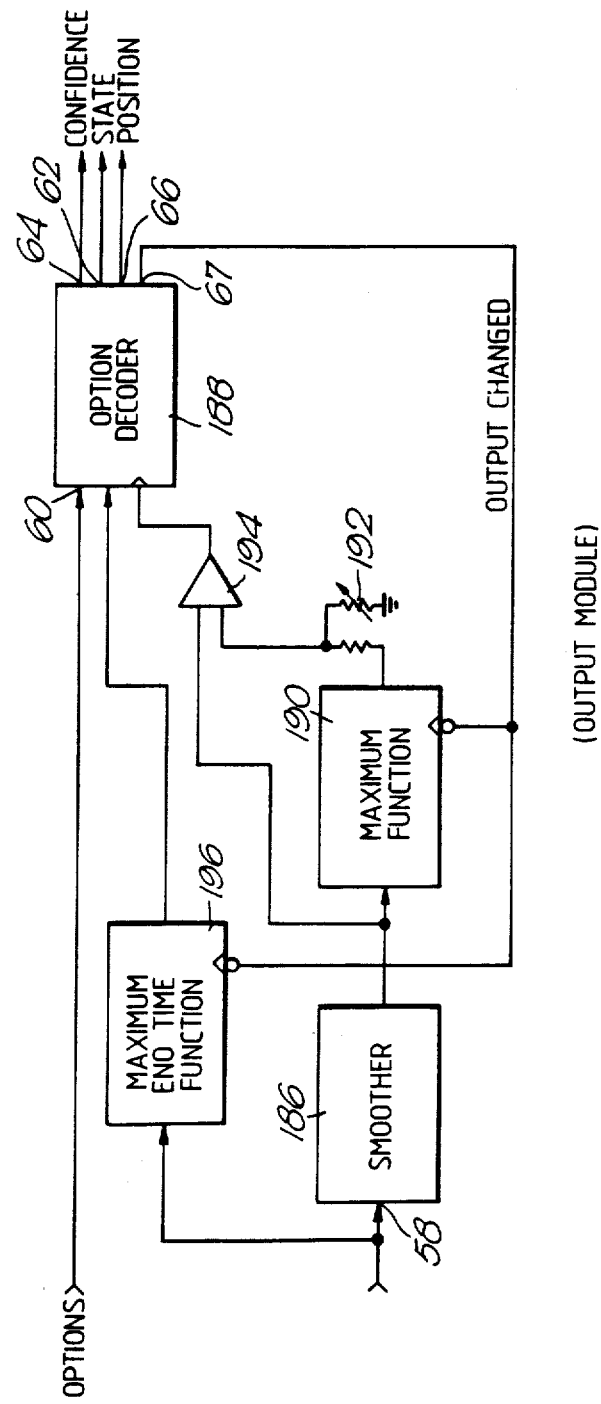
FIG. 12 is a block diagram of the output module shown in FIG. 5.

Referring to FIG. 12, there is shown a detailed block diagram of the output module 34. An option decoder 188 receives the options from the decide module 32 at terminal 60. The options including states, lengths and probabilities are stored in decoder 188 and are addressed by time. The output module uses the end of state probability signal which is received at terminal 58 to decide when the data in the list of options is sufficiently good to output as a recognition of the input objects as a recognized state. The end of state probability is smoothed by circuit 186 to avoid false triggers. The smoothed function is provided to circuit 190 where the maximum value of the smoothed function is stored. A divider 192 is provided to select a predetermined percentage of the stored maximum value. The output of the smoother 186 and the divider 192 are provided to a comparator 194 so that when the peak value of the signal coming from the smoother 186 drops below the predetermined percentage of the stored maximum value comparator 194 provides an output to option decoder 188 to trigger said decoder.

The End-Of-State Probability signal $P_E$ is also provided to a maximum end-time circuit 196 which stores the time of the actual maximum end of state probability value. This maximum end-time value is also provided to option decoder 188 so that when the decoder 188 is triggered it may select the best options that were stored and addressed at the maximum end-time. These best options signals are then provided as confidence, state and position output signals. At this time an output changed signal is provided by the decoder 188 which is used to reset the maximum function circuit 190 and the maximum end-time function circuit 196 so that a new maximum function and maximum end-time may be sought.

Figure 13:
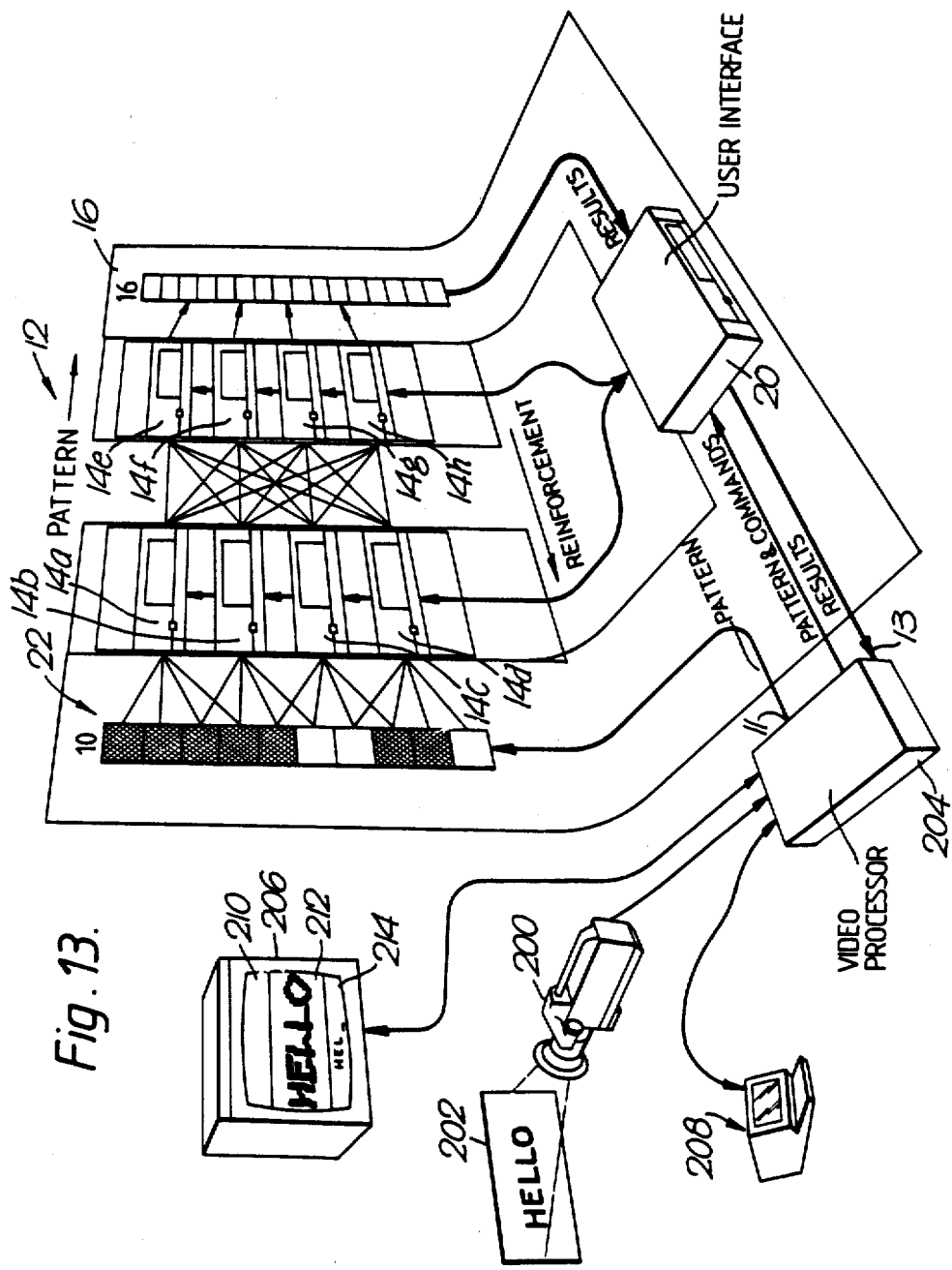
FIG. 13 illustrates the use of a PLS in a character recognition system.

Referring to FIG. 13, there is shown the use of a probabilistic learning system in a character recognition application. A video camera 200 is focused on a hand printed word 202 namely "HELLO" that is to be recognized. The signals from the video camera 200 are provided to a video processor 204 which provides outputs to a video monitor 206. A workstation 208 may be provided particularly for use during the learning mode for providing external reinforcement. The PLS is similar to that shown in FIG. 1 in that it comprises an array 12 consisting of eight individual PLE's 14a to 14h, an input processor 22, an output processor 16 and an interface circuit 20.

The input to the PLS is terminal 11 from the video processor while the PLS output 13 is passed through the user interface 20 and on to the video processor 204. The video representation of the hand printed word "HELLO" is shown in the upper portion of the video monitor at 210. The video representation is digitized as shown at 212 on the video monitor.

The digitized word "HELLO" is shown more clearly in FIG. 14 where each vertical slice is a time frame containing a predetermined number of pixels of information as for example 10 pixels as shown in FIG. 14. The digitized word is scanned from left to right and input objects in the form of time slices containing 10 pixels each are provided to the PLS. The sequences of objects could be provided to a single high capacity PLE or to a PLS comprised of an array as in the case of FIG. 13.

The power of using a PLS comprising an array may be illustrated by referring to FIGS. 1 and 13. Inputting objects containing 10 pixels presents a rather complex recognition problem which would require a PLE with considerable capacity. The array provides the advantage of parallelism to speed up the execution of the recognition task by permitting the input information to be partitioned between a plurality of individual PLE's. The information is partitioned in an overlapping or redundant manner to enhance the reliability of the system. Due to the redundant overlapping a breakdown in a portion of the system will not affect the overall system operation.

Referring to FIG. 13, there is shown, that the input preprocessor 22 receives 10 pixels of information and partitions these pixels so that pixels 1 to 4 are provided to the first PLE 14a, pixels 3 to 6 are provided to PLE 14b, pixels 5 to 8 are provided to PLE 14c and pixels 7 to 10 are provided to PLE 14d. Each PLE performs a recognition function on the inputs it receives to identify output states in the form of a certain type of feature. This is not to be confused with a feature extraction steps but is a true pattern classification step and illustrates the generalized aspect of the PLE which allows it to recognize and learn anything such as an abstract feature as opposed to such things as letters, numbers, etc. It might be said that the features that are recognized are slices of output states. Thus, the first bank of four PLE's i.e. PLE's 14a to 14d receives a total of 16 bits of information, 4 bits to each PLE in overlapping relationship. Each PLE in the first bank outputs 4 bits identifying a particular feature out of 16 possible features.

The 4 bit feature representation outputted from PLE 14a of the first bank is provided to the inputs of the PLE's of the second bank i.e. 14e to 14h. In like manner, the 4 bit representation of a feature at the output of the second PLE 14b of the first bank is provided to the inputs of each PLE of the second bank PLE's. Thus, each PLE of the second bank receives four, 4 bit feature inputs. Each PLE in the second bank provides a 4 bit output which comprise one fourth of a 16 bit redundantly coded name for a recognized character or output state. Thus, the recognition task is simplified in that each PLE in the second bank must only recognize the first 4 bits of a 16 bit coded name for a character. The output processor 16 receives the 16 bit redundantly coded representation of the output state and reduces the 16 bits to 8 bits using a BCH decoding system. The 8 bit output provided at 13 is in the form of an ASCII Code for a character recognition system. The ASCII Code has the capability of representing 256 possible letters or characters.

By using the 16 to 8 bit reduction, significant data overlap is provided so that many of the 16 bits could be in error or missing and the output would still be correct. Thus, one PLE could fail and the system would continue to function without error.

Training of the array takes place in a manner similar to that of an individual PLE in that external reinforcement learn signals may be provided through a human interface. In addition, the PLE's of an of array are interconnected so that the self learn signal from an individual PLE is provided to the learn input of its source PLE's. Thus, when the PLE of a second bank provides an output with a high confidence level, this indication will be relayed back to the source PLE's in the first bank. All of this training is of course in addition to the internal self learning of each individual PLE.

The array shown in FIGS. 1 and 13 comprises a 4 by 2 arrangement. The next size array would be 16 by 3 for a total of 64 PLE's comprising the array. Larger arrays may be built using this progression in size; however, while a larger array would provided for more parallelism in its operation and greater reliability, its speed would be reduced due to the number of PLE's through which the data must flow from the input to the output.

FIG. 14 shows an expanded concept of using a plurality of PLS's wherein pixels 216 are first used to recognize characters 218 as output states from PLS 12. The characters 218 may become input objects to a PLS 220 which is used to recognize words 222 as output states. The words 222 become input objects to a PLS 224 to recognize scripts 226 as output states.

It should also be remembered that the PLS is not limited to use in an optical character reader but rather may be used in many other applications, such as voice recognition. The PLS is appropriate for use wherever sequential patterns are to be recognized.

What is claimed is:
1. A probabilistic learning element, that sequentially receives objects and outputs sequences of recognized states, said learning element comprising:
means for sequentially receiving objects;
means for storing,
said received objects,
sequences of received objects,
previously learned sequences of states,
states contained in said previously learned sequences of states, and
predetermined types of knowledge relating to,
said previously learned sequences of states,
said states contained in said previously learned sequences of states,
objects contained in said previously learned sequences of states, and
sequences of objects contained in said previously learned sequences of states, whereby current object information relating to
said received objects and said sequences of received objects is stored as well as statistical information relating to previously learned sequences of states and said states, objects and sequences of objects contained in said previously learned sequences of states;
means for correlating said stored current object information with said stored statistical information for assigning probabilities to possible next states in the sequence of recognized states;
means, responsive to said probabilities of possible next states, for determining a most likely next state;
means, responsive to the stored current object information and statistical information, for providing a signal corresponding to the probability that a state has ended; and
means, responsive to said end of state signal, for outputting said most likely next state as a recognized next state in a recognized state sequence.
2. A probabilistic learning element as described in claim 1, additionally comprising means for providing a rating of confidence in said recognized next state.
3. A probabilistic learning element as described in claim 2, additionally comprising;
means for accumulating the ratings of confidence of the recognized states of the recognized state sequence; and
means, responsive to said accumulated ratings of confidence, for causing said means for storing to store the recognized state sequence as a previously learned sequence of states, and to store the objects, sequences of objects and states in the recognized state sequence and the predetermined types of knowledge relating to the objects, sequences of objects, states and sequences of states forming said recognized state sequence as statistical information relating to previously learned sequences of states when the accumulated ratings exceed a predetermined threshold level.
4. A probabilistic learning element as described in claim 1, additionally comprising learning supervision means, responsive to external reinforcement signals, for causing said means for storing to store the recognized state sequence as a previously learned sequence of states, and to store the objects, sequences of objects and states in the recognized state sequence and the predetermined types of knowledge relating to the objects, sequences of objects, states and sequences of states form- ing said recognized state sequence as statistical information relating to previously learned sequences of states.

5. A probabilistic learning element as described in claim 4, additionally comprising means for correcting a recognized state sequence prior to initiating an external reinforcement signal.

6. A probabilistic learning element as described in claim 1, additionally comprising:
means for providing a rating of confidence in said recognized next state;
learning supervision means, adapted to receive said rating of confidence and an external reinforcement signal, for providing an output signal in response to accumulated ratings of confidence of the recognized states of the recognized state sequence and the external reinforcement signal when either the accumulated ratings of confidence exceed a predetermined threshold level or an external reinforcement signal is received; and
means, responsive to the output signal from the learning supervision means, for causing said means for storing to store the recognized state sequence as a previously learned sequence of states, and to store the objects, sequences of objects, and states in the recognized state sequence and the predetermined types of knowledge relating to the objects, sequences of objects, states and sequences of states forming said recognized state sequence as statistical information relating to previously learned sequences of states.

7. A probabilistic learning element as described in claim 6, additionally comprising means for correcting a recognized state sequence prior to initiating an external reinforcement signal.

8. A probabilistic learning element as described in claim 1, wherein the predetermined types of knowledge that are stored include the number of occurrences of: each stored object, each stored sequence of objects, each stored state and each stored sequence of states.

9. A probabilistic learning element as described in claim 8, wherein the predetermined types of knowledge that are stored additionally include state lengths and the number of their occurrences and sequences of state lengths and the number of their occurrences.

10. A probabilistic learning element as described in claim 9, wherein the predetermined types of knowledge that are stored additionally include state-length pairs and the number of their occurrences and sequences of state-length pairs and the number of their occurrences.

11. A probabilistic learning element as described in claim 1, wherein the means for correlating includes a first means for determining the probabilities that possible states will span an object sequence having a particular begin time and end time and second means for determining the probabilities of state-length pairs given the previous state-length pair context.

12. A probabilistic learning element as described in claim 11, additionally comprising means responsive to the previously mentioned probabilities for implementing an algorithm to provide probabilities of possible states, with a particular length that span an object sequence given the previous state-length pair context.

13. A probabilistic learning element as described in claim 1, wherein the means for storing stores information on a plurality of previously learned states and the objects contained therein, whereby several levels of context are stored and the means for correlating implements an nth order Markov process correlating several levels of stored context.

14. A method of recognizing a sequence of states from a sequence of inputted objects utilizing a probabilistic learning element, comprising the steps of:
correlating said sequence of inputted objects and predetermined types of knowledge relating to said sequence of inputted objects with stored information relating to previously learned states, objects and sequences of objects and predetermined types of knowledge relating to said previously learned states, objects and sequences of objects including the number of occurrences of each;
providing probabilities for possible next states in a sequence of states based on said correlations;
determining a most likely next state in the sequence of states each time a new object is received;
deriving from stored information a signal corresponding to the probability that a state has ended; and
outputting the most likely next state as a recognized next state in the sequence of recognized states in response to the end of state probability.

* * * * *